Figure 4:
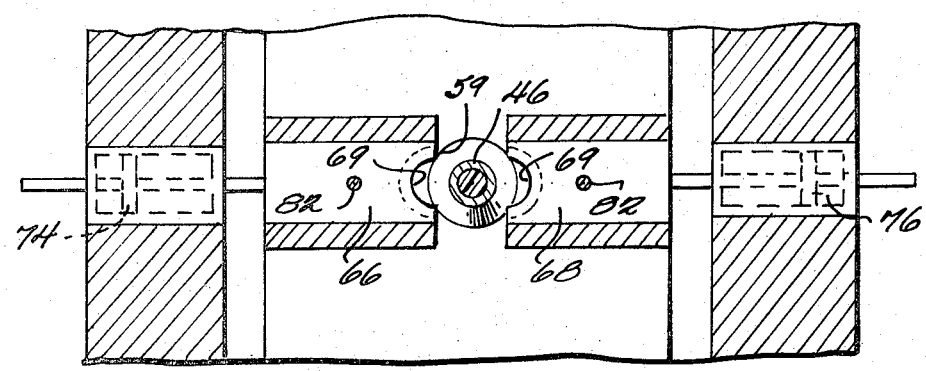

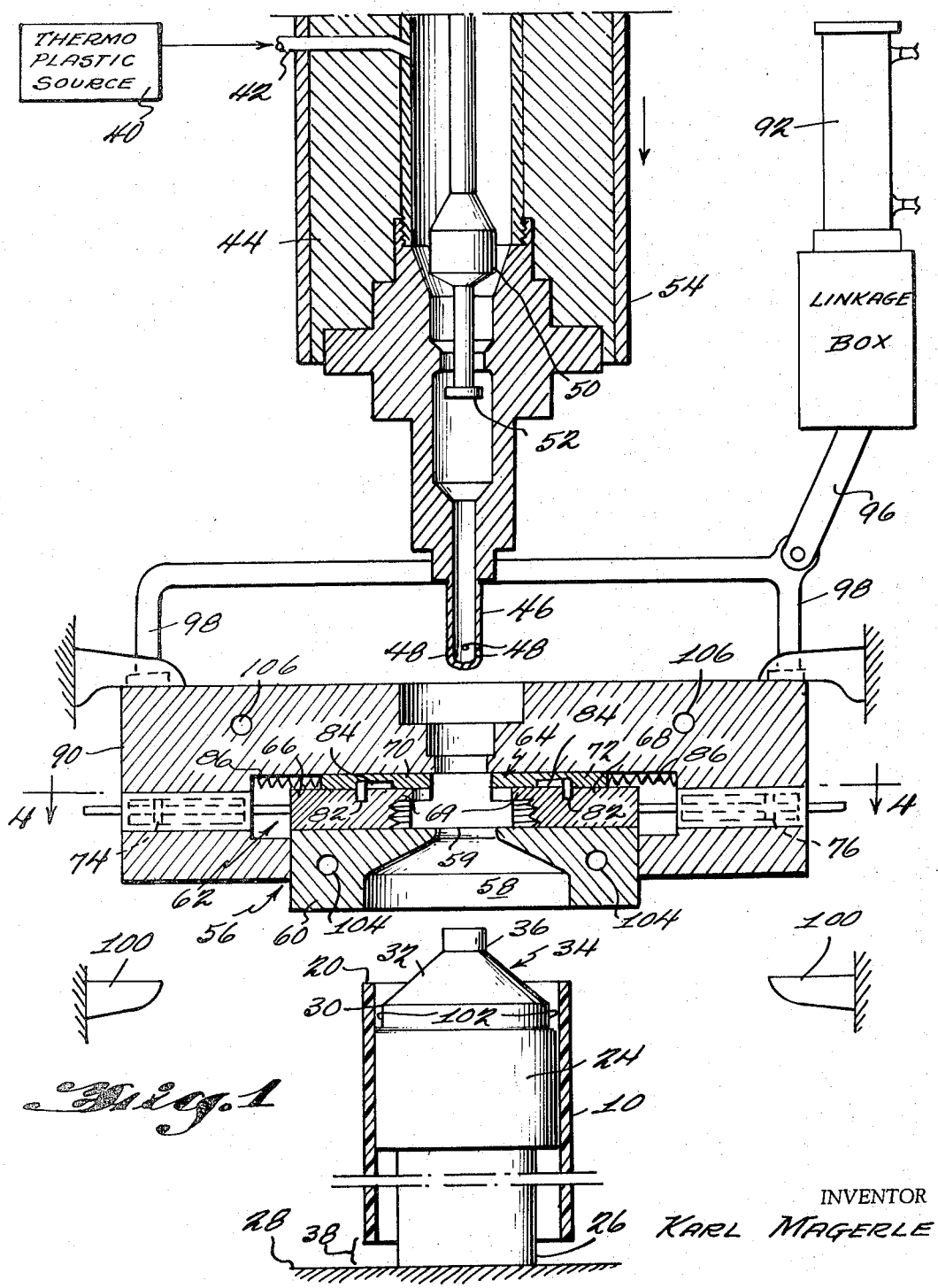

April 11, 1967  K. MAGERLE  3,313,875
PLASTIC FORMING PROCESS AND APPARATUS
Filed April 21, 1966  13 Sheets-Sheet 2

INVENTOR
KARL MAGERLE

BY Cushman, Darby & Cushman
ATTORNEYS

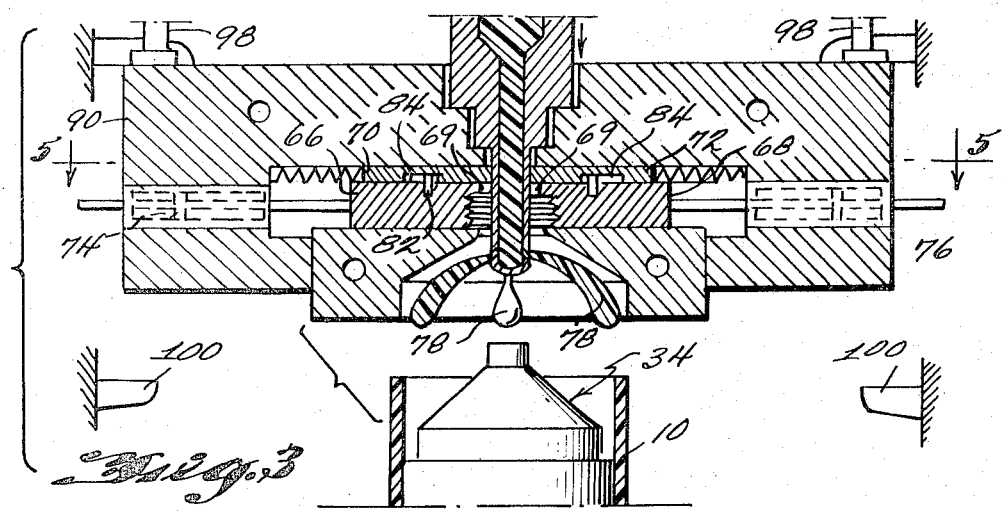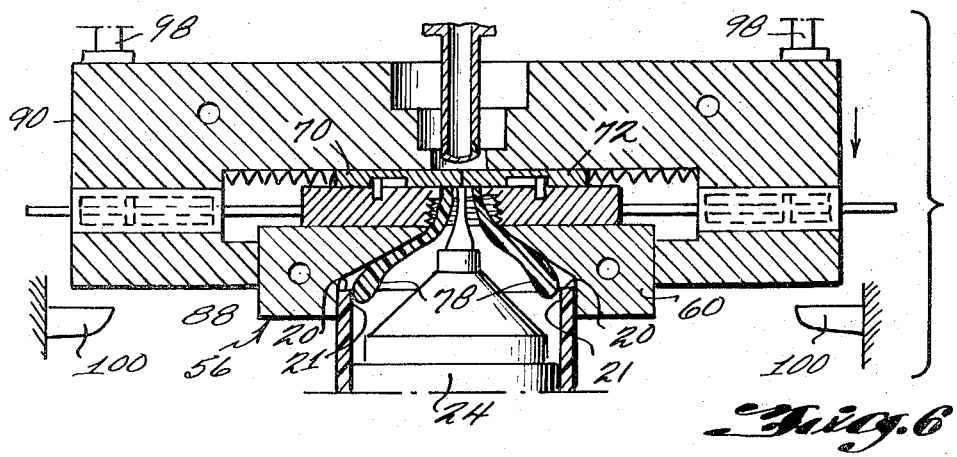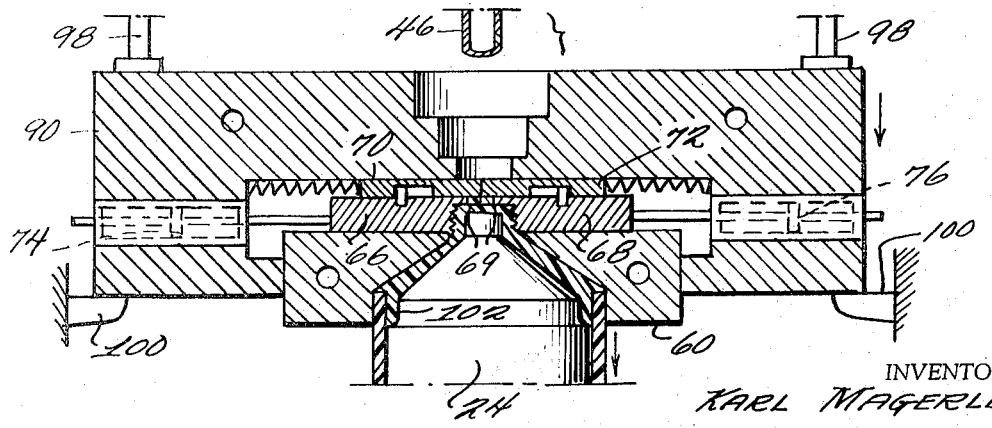

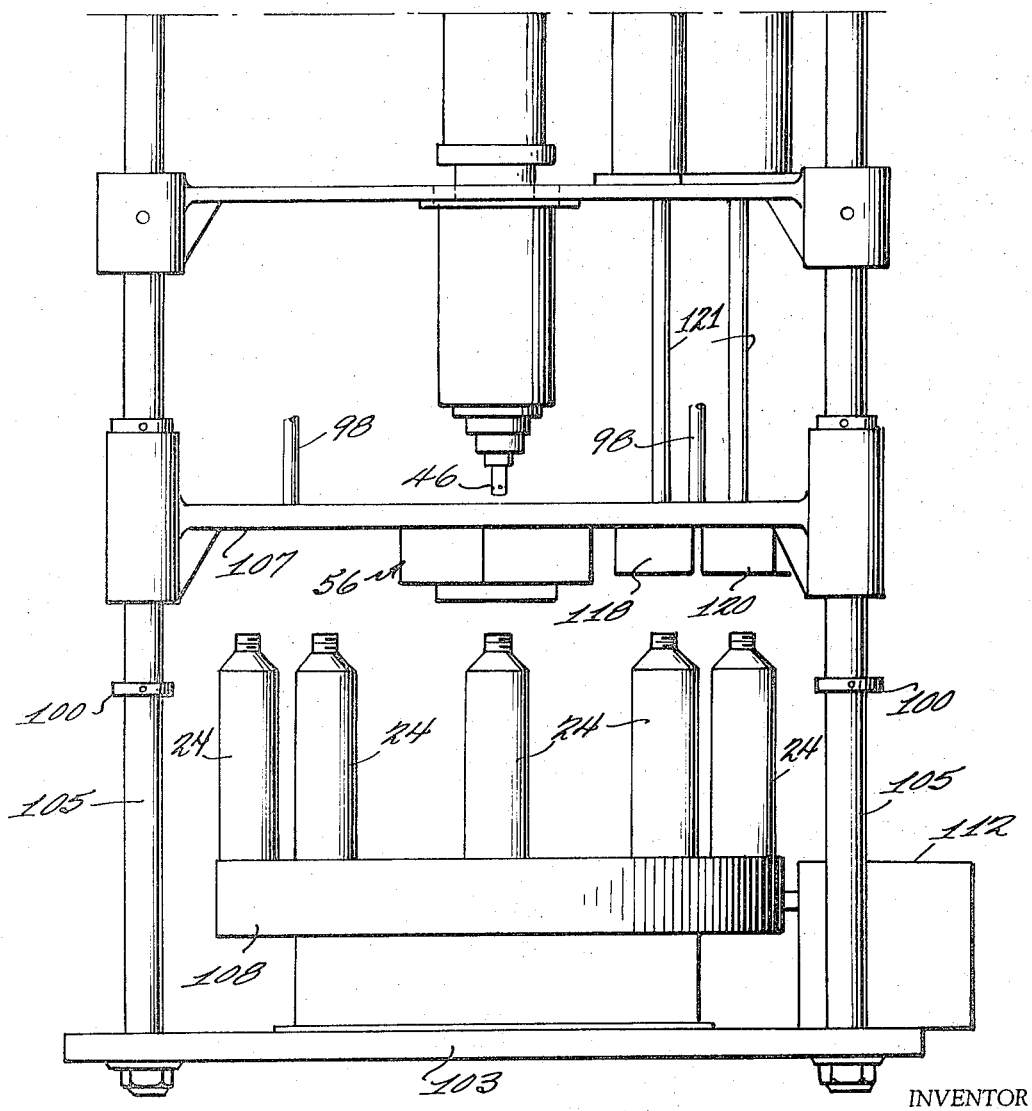

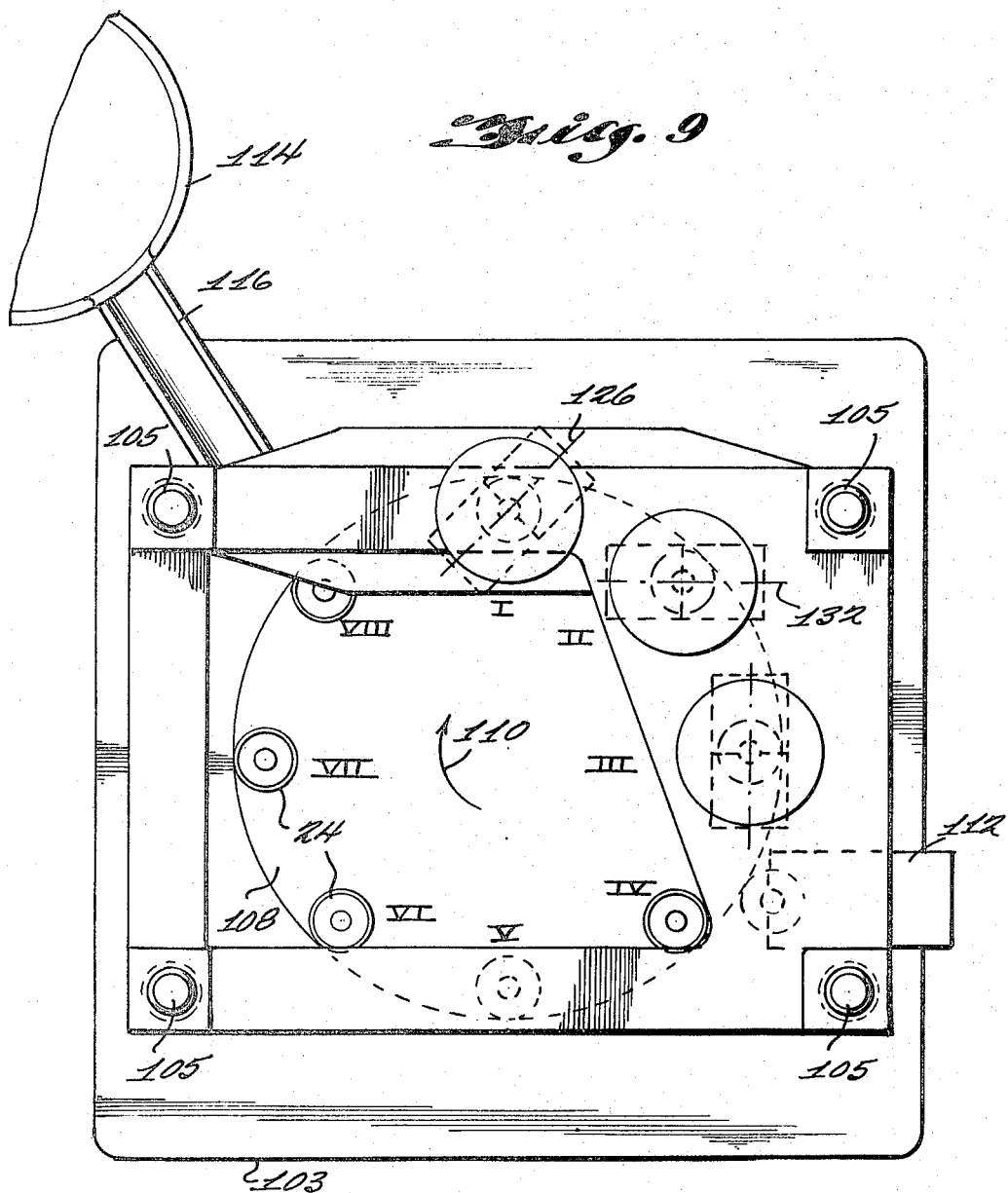

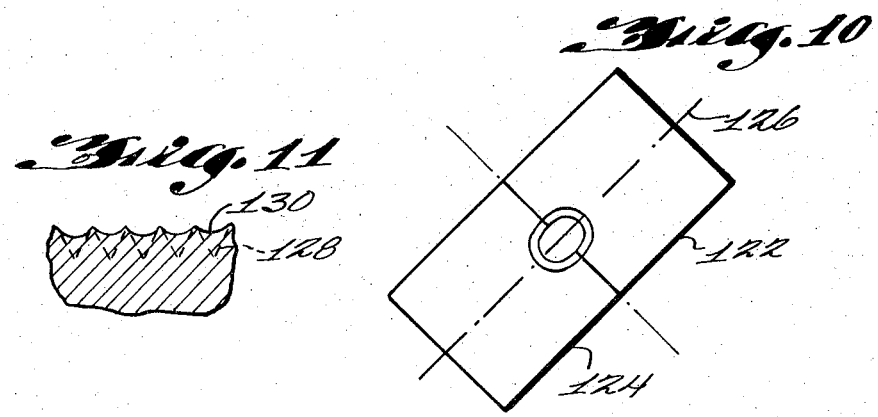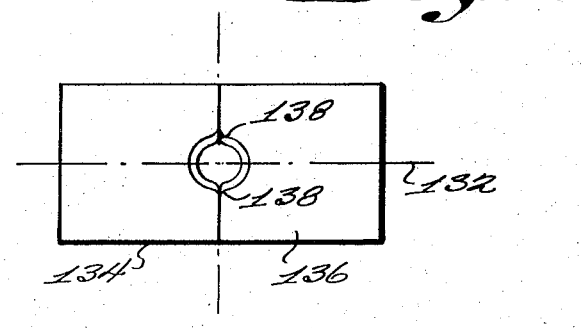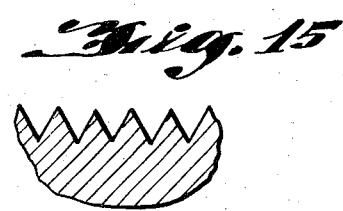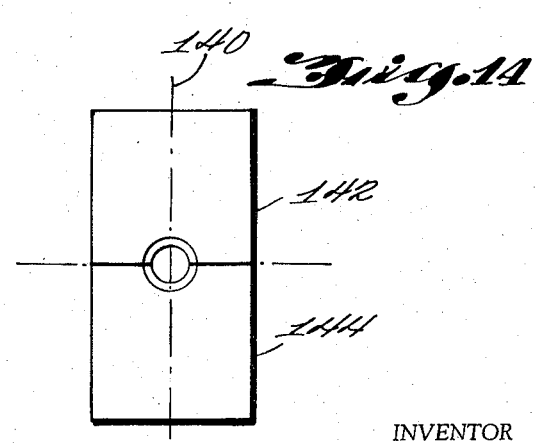

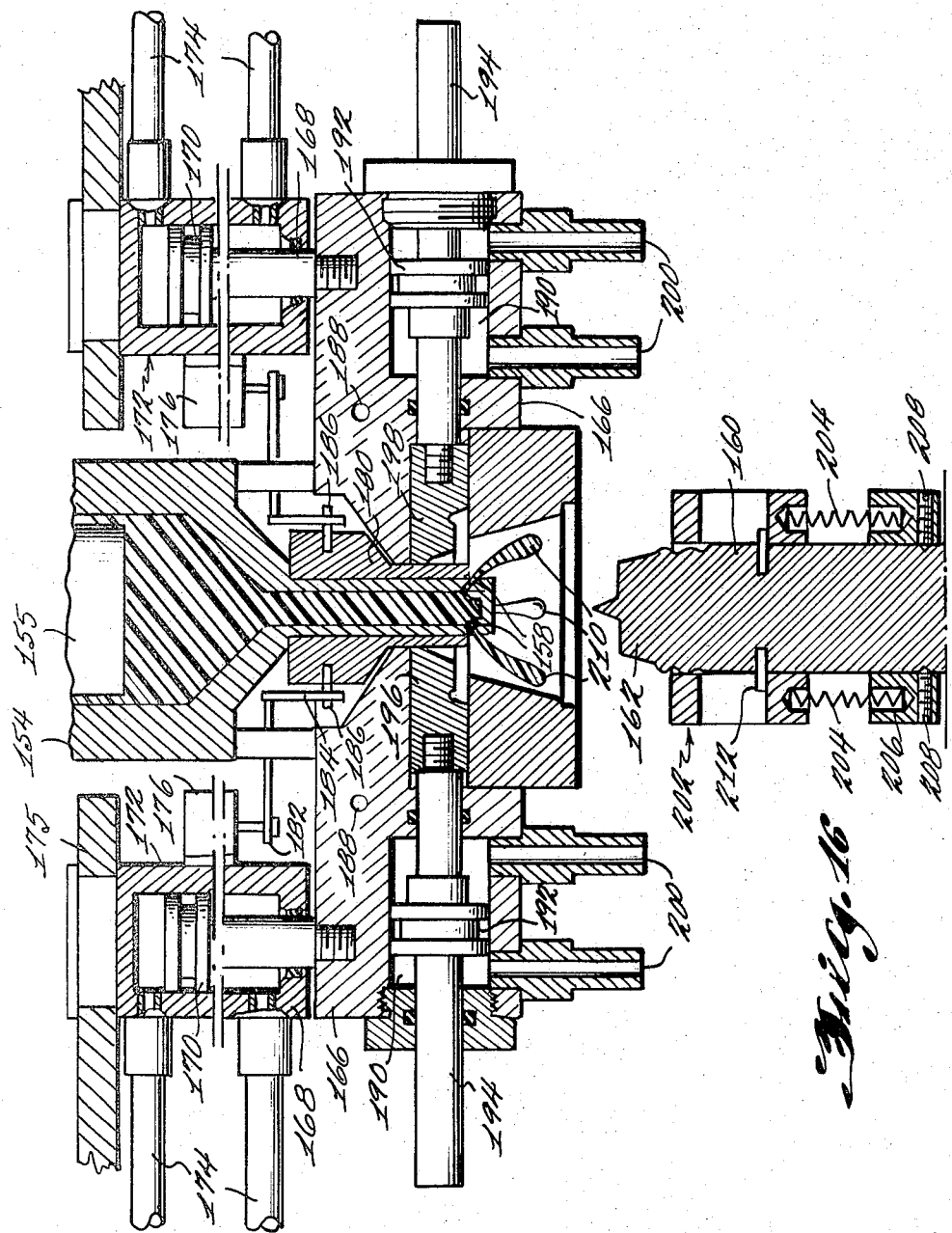

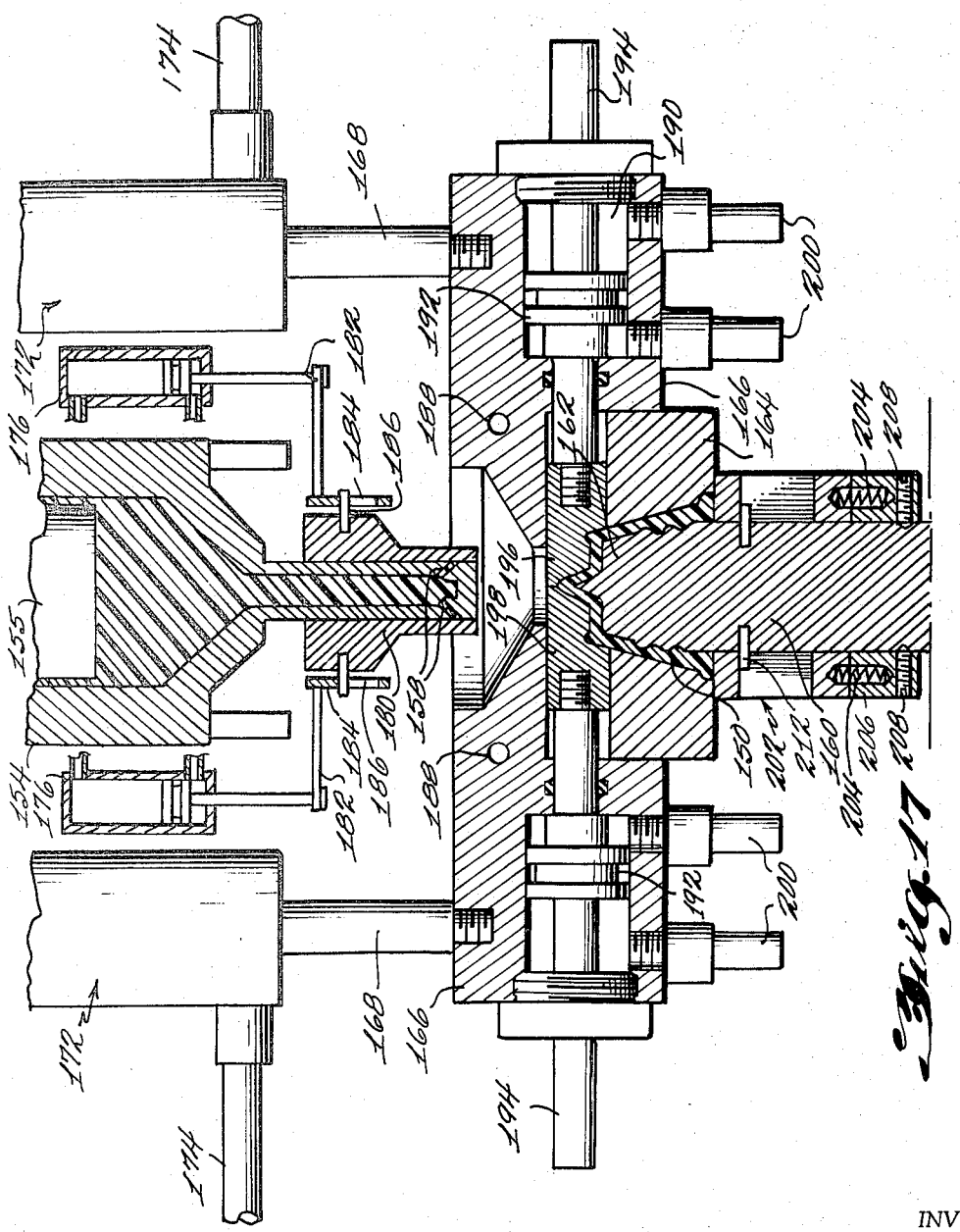

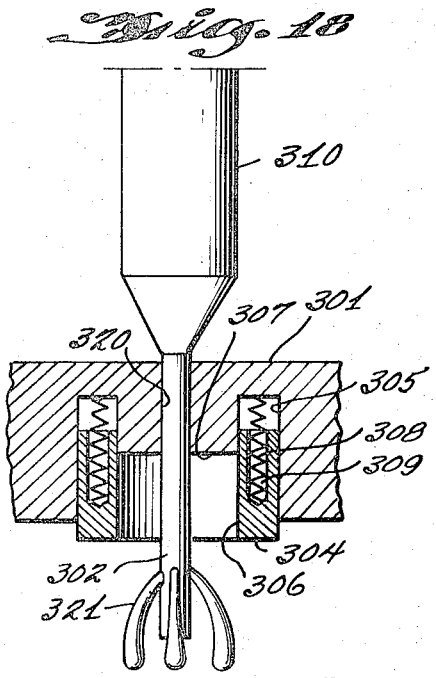
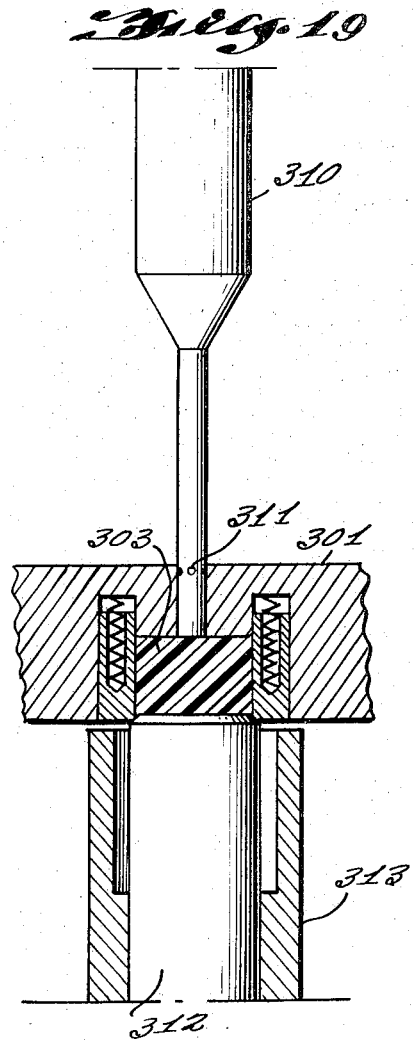
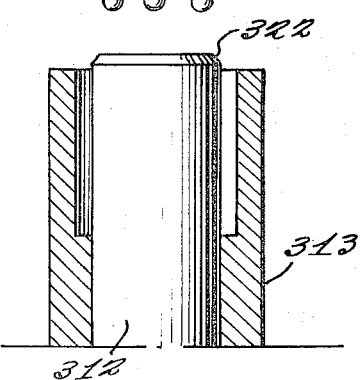
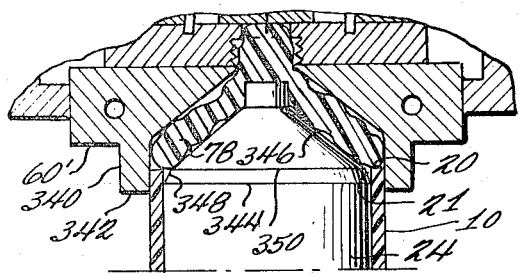
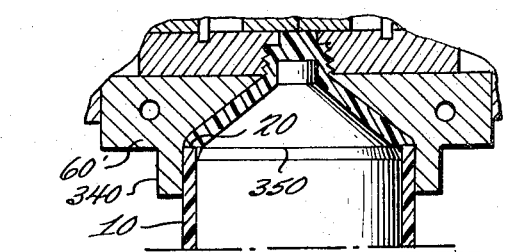

April 11, 1967 K. MAGERLE 3,313,875
PLASTIC FORMING PROCESS AND APPARATUS
Filed April 21, 1966 13 Sheets-Sheet 10
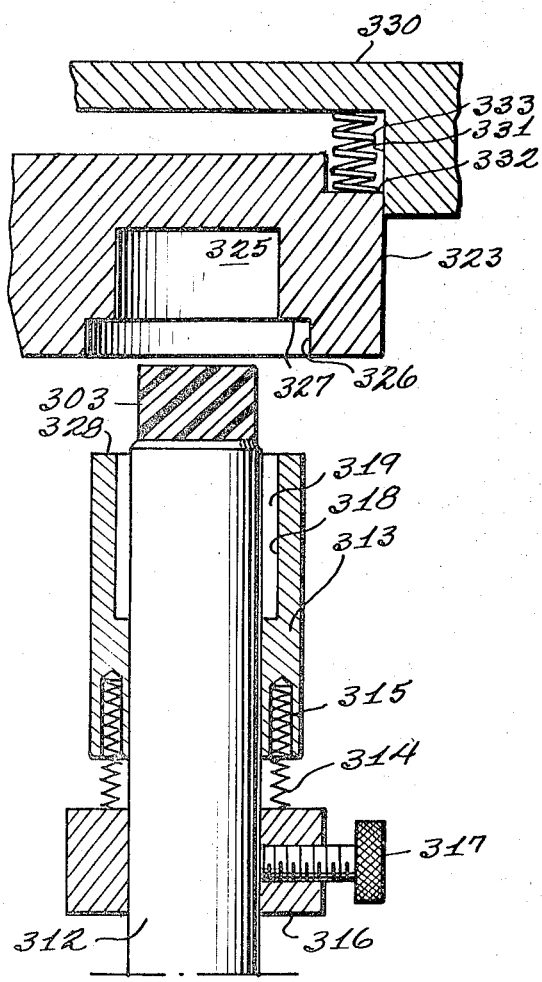
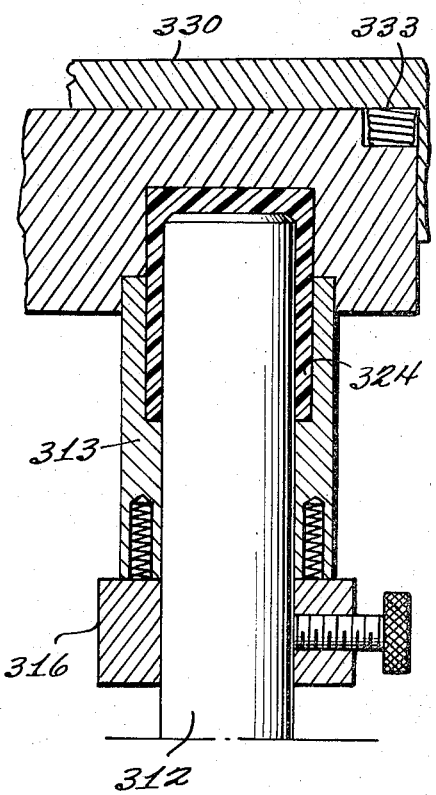
INVENTOR
KARL MAGERLE
BY
Cushman, Darby & Cushman
ATTORNEYS

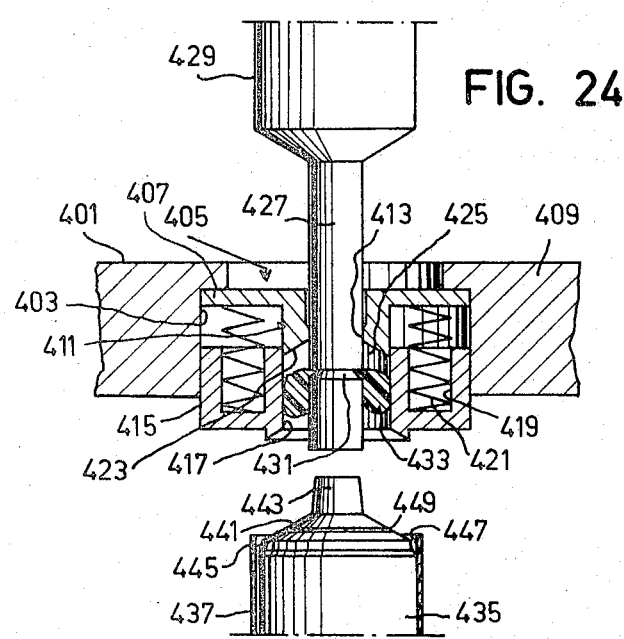
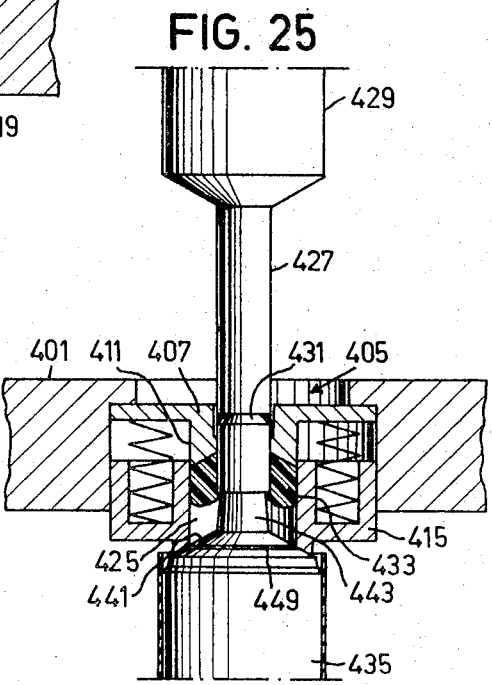
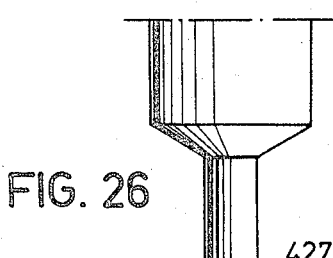
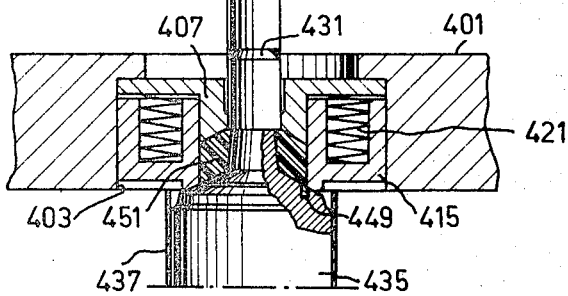

April 11, 1967 K. MAGERLE 3,313,875
PLASTIC FORMING PROCESS AND APPARATUS
Filed April 21, 1965 13 Sheets-Sheet 12

INVENTOR
Karl Magerle
BY
Cushman, Darby-Cushman
Attorneys

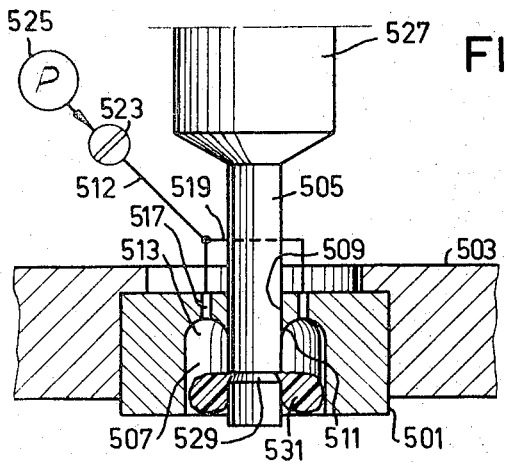
FIG. 29
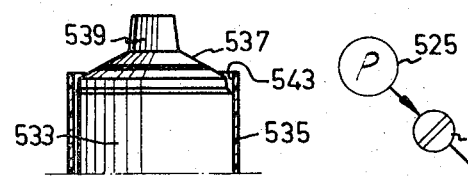
FIG. 30
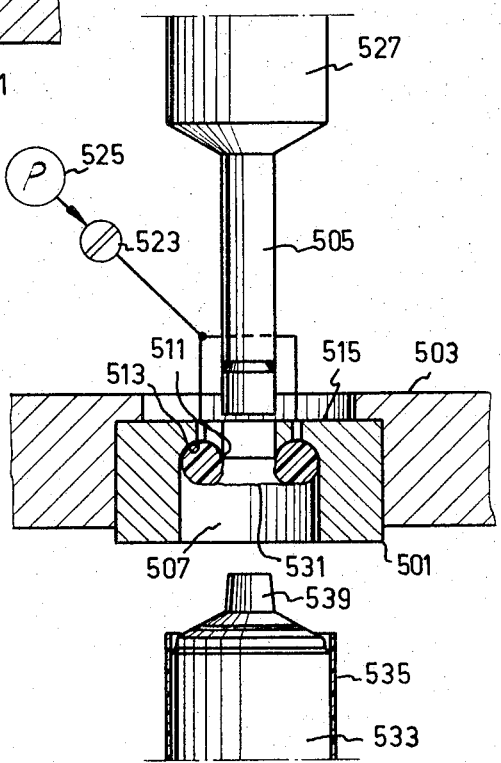
FIG. 31
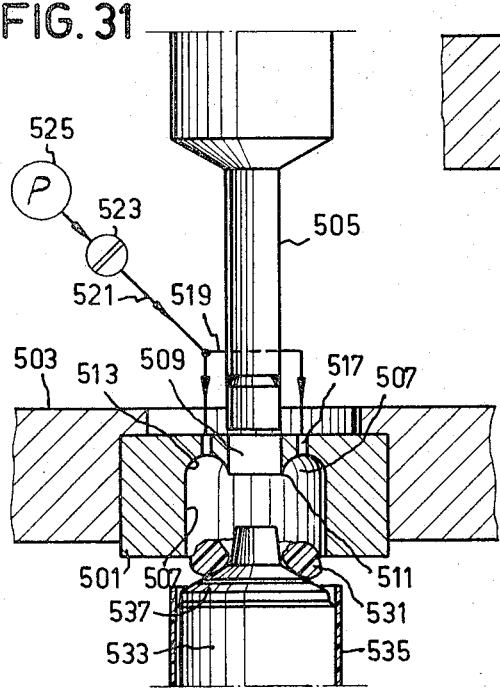

United States Patent Office 3,313,875
Patented Apr. 11, 1967

3,313,875
PLASTIC FORMING PROCESS AND APPARATUS
Karl Magerle, Im Vorderen Erb 1,
Kusnacht, Switzerland
Filed Apr. 21, 1966, Ser. No. 552,360
Claims priority, application Switzerland, Apr. 19, 1961,
4,536/61; June 15, 1961, 6,994/61
46 Claims. (Cl. 264—267)

This application is a continuation-in-part of my now forfeited application Serial Number 188,776 filed April 19, 1962. Foreign priority, under 35 U.S.C. 119, of that part of the disclosure common to this application and the forementioned forfeited application is claimed.

This invention relates to thermoplastic material, and especially to a process and apparatus for forming the products from thermoplastic material by compression molding.

The invention is applicable to produce plastic articles of various sizes, shapes, and kinds, especially hollow or cavitated articles such as tubes and caps. Some of the articles which this invention will produce require no fusing or welding between different parts of the article, but others such as collapsible thermoplastic tubes or containers with a dispensing head.

It is a main feature and object of this invention that a measured amount of hot but cohesive thermoplastic material is disposed, as by being extruded, into the enlarged volume of space in a female mold in a flared skirt-like configuration. The extrusion may effect separate strands or a continuous skirt, and in any case the extruded material is then placed under pressure by means of a male die reducing the volume of space in the female mold to a predetermined molding cavity. Preferably, the female mold is fully open at its male die receiving end while the extruding takes place, though in certain instances and with disadvantages the female mold may have its opening closed by the die but with the enclosed space being considerably larger than the final molding cavity. The advantages of a fully open female mold include less chance of the extruded material touching the cooled metal of the male die or female mold before it should and ability to produce products faster due to less travel time required for relative movement of mold and die toward and away from each other during the overall process time since the depth of the mold cavity need not be as great.

The process according to the present invention effects the manufacture of thermoplastic articles by means of a compression molding method, as opposed to prior art injection type methods. One of the main features of this invention is that the thermoplastic material is sufficiently cohesive that it may be extruded into a plurality of hot strands that continue to hand from the extruder for a sufficient time to allow the extruder to be effectively withdrawn from a rear opening in a female mold while the strands are removed or disjoined from the extruder and placed around the inside surface of the mold. The mold is thereafter closed first at its rear end, then at its front part by relative movement with a mandrel or male die under pressure so as to effect a molding of an article conforming to the shape dictated by the mold and die. The strands of material lie against the inner side of the female mold, except for their lower ends which bow inwardly and retain their heat without being cooled by the sides of the mold. These lower ends of the strands, in one specific embodiment, first touch the end of the tubular body that forms part of the potential container being made. In a preferred embodiment, this end of the tube extends above the corners of the shoulder of the mandrel, and the lower ends of the hot strands of thermoplastic material first touch an inside circumferential band adjacent the end of the tube. This initially heats the tube and effects some initial fusion. The time involved, however, is quite short, and the female mold and mandrel continue to be pressed together so as to push the tube body further onto the mandrel and press the plastic material upwards into the remaining portions of the female mold, thereby completing the formation of a neck and shoulders part of the head of the container.

Figure 5:
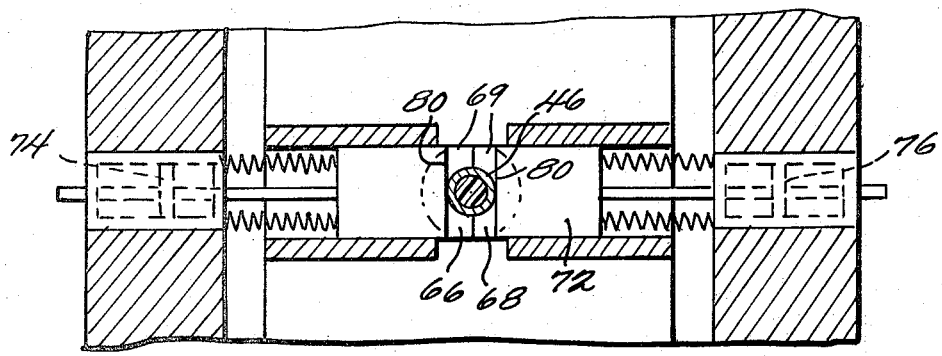
Figure 2:
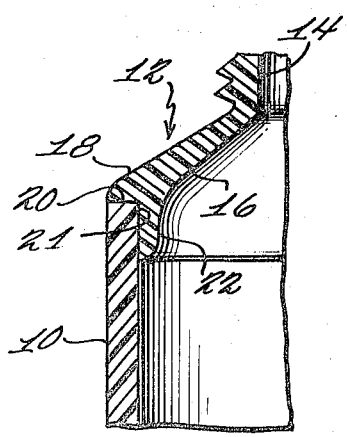
Figure 27:
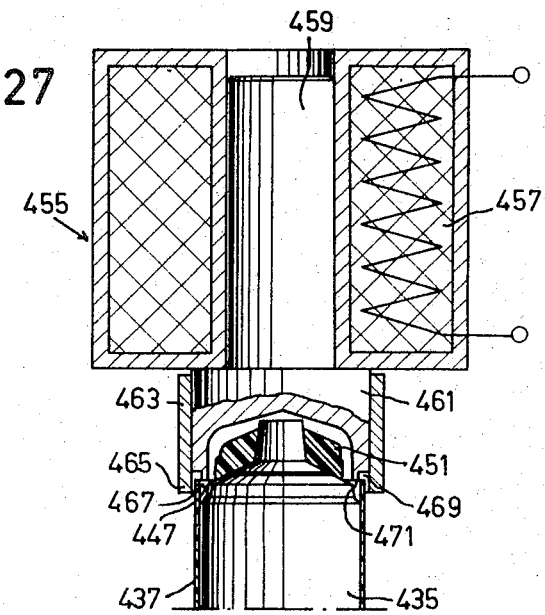
Figure 28:
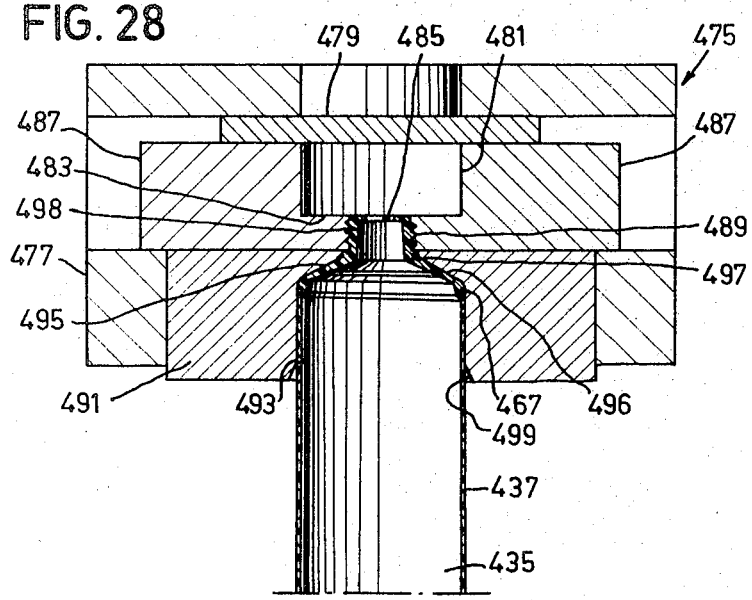

Details of the invention will become more apparent after reading the following description in conjunction with the attached drawings, in which:

FIGURE 1 is a diagrammatic and structural cross sectional view of apparatus according to one embodiment of the invention, FIGURE 2 is a cross sectional view of a part of a container according to this invention, FIGURE 3 shows a part of the apparatus of FIGURE 1 in position for accomplishing a certain step in the process of this invention, FIGURE 4 is a cross sectional view taken substantially along the line 4—4 of FIGURE 1, FIGURE 5 is a cross sectional view taken substantially along the line 5—5 of FIGURE 3, FIGURES 6 and 7 show a part of the FIGURE 1 structure in different positions representing successive steps in the process of this invention, FIGURE 8 is an elevational view diagrammatically illustrating a multiple station embodiment of this invention, FIGURE 9 is a plan view of the FIGURE 8 embodiment, FIGURES 10, 12 and 14 represent thread molds at successive stations in the FIGURES 8 and 9 embodiments, FIGURES 11, 13 and 15 indicate the threads as formed by these respective molds, FIGURES 16 and 17 show initial and final steps of apparatus for producing a pointed nose cap, FIGURES 18 and 19 illustrate two different positions of another embodiment of the invention in which a blank is first formed, FIGURES 20 and 21 show two different positions of apparatus at a second station for forming the blank resulting from the FIGURE 19 operation into a cap, FIGURES 22 and 23 illustrate a modification of FIGURES 6 and 7 respectively, FIGURES 24, 25 and 26 are diagrammatic cross sectional views of three different positions of another embodiment of the invention for forming a blank and transferring such blank to a die carrying a tube section, at a first station, FIGURES 27 and 28 illustrate in cross section second and third stations for heating of the transferred blank of FIGURE 26 and for forming and welding a head portion to the tube section, and FIGURES 29, 30 and 31 illustrate a modified process for forming a blank in three positions in the embodiment of FIGURES 24 to 28.

The apparatus shown in FIGURE 1 may be utilized to make, for example, a thermoplastic container like the one a portion of which is illustrated in cross section in FIGURE 2. As shown in FIGURE 1, the container includes a pre-formed tubular body 10 to which is integrally fused the head 12 shown in FIGURE 2. This head includes a neck portion 14 and a shoulder portion 16 which are integral with one another. As will be noted, the shoulder has a rounded outer corner forming portion 18 which fully abuts the outer end surface 20 of the tubular body 10. This surface, as will be appreciated, is parallel or normal to the longitudinal axis of the tubular body. It will also be noted that the inner and outer sides of shoulder 16 are not parallel, but diverge outwardly so as to be more narrow near the neck portion 14. Additionally, shoulder 16 has a depending annular skirt 22 which is contiguous with the inside surface 21 of the tubular body for a given axial length thereof adjacent the end surface 20. Neck 14 may be threaded, if desired.

As clearly shown in FIGURE 2, the upper end of the tubular body 10 is straight and does not fold over or under the shoulder section 16. Instead, as will be more fully appreciated after the description of the process of this invention, the shoulder 16 is, in the preferable embodiment, fused to the end surface 20 of tube 10 as well as to a narrow inside circumferential band 21 adjacent that end. This provides for a stronger weld between the shoulder and tube than has heretofore been obtainable. It will be noted that due to the greater thickness of shoulder 16 adjacent the tube 10, more plastic material is available with its attendant heat to effect an integral, secure weld to the tube body 10.

Initially, a length of tube is cut to predetermined lengths corresponding to the desired length for tubular body 10. Such resultant tubes are successively disposed on a mandrel 24 as shown in FIGURE 1. This mandrel is of the desired size and shape for the container to be made, and itself is attached in any desirable manner to an upright member 26 that stands securely on a base 28. Different mandrels may be used to accommodate different length or diameter tubes. As shown in FIGURE 1, tube 10 is initially inserted, in the preferred embodiment now being described, over mandrel 24 just so far that its upper end surface 20 is a predetermined distance above the corner 30 of shoulder 32 of the mandrel head 34 which otherwise includes a neck 36. Tube 10 is held on mandrel 24 by frictional engagement to this desired height, and it thereby rests a predetermined distance 38 above base 28, until it is later pushed down thereagainst during the head fusing and molding process.

The thermoplastic granulated material to be used in making the head for the tubular body 10 may be obtained from any suitable source 40 from which it is delivered via a tube 42 to the interior of a cylinder 44. This cylinder is attached to a nozzle 46 through the apertures 48 of which pistons 50 and 52 cause a measured amount of plastic material to be extruded, when nozzle 46 is in its predetermined lowered position later mentioned. Surrounding cylinder 44 is a heater 54 that heats the granulated thermoplastic material within cylinder 44 to the proper temperature for causing the viscosity thereof to be as desired. As will become apparent, nozzle 46 cooperates with a female mold 56 to lay within that mold strands of hot thermoplastic material. The lower end of nozzle 46 has any desired number of apertures 48, for example six, if not more, preferably equally spaced in a ring around the periphery of the nozzle. These apertures extend upwardly through the side of the nozzle so as to have a longitudinal axis that makes an angle of between 30° and 60° preferably, for example 45°, with the vertical.

In the first step of the process, cylinder 44 is lowered to the position shown in FIGURE 3, so that apertures 48 of nozzle 46 are in the open space 58 of the female mold 56. This mold is normally open at its upper or rear end so that nozzle 46 can enter into the space 58. Several sections go to make up the overall female mold. These include a shoulder forming section 60, a neck forming section 62 and a rear end closing section 64. The latter two sections are, in turn, made up of two halves which are radially movable. That is, neck section 62 includes a left half portion 66 and a right half portion 68, while the rear end closing section 64 includes left and right halves 70 and 72. Radial movement of the neck forming sections 66 and 68 may be controlled by fluid operated pistons 74 and 76 respectively, or by similar means.

As shown in FIGURE 3, after nozzle 46 has been lowered into the open space 58, and pistons 50 and 52 are lowered under pressure, a measured amount of hot, cohesive, thermoplastic material extrudes from respective apertures 48 as strands 78. "Measured" here does not mean that the amount extruded is necessarily exactly that amount needed to form the tube head, but approximately at least that amount. The amount of pressure utilized in extruding the thermoplastic material is considerably less than that necessary for normal injection type processes. For example, instead of using 500 or more atmospheres pressure as required for closed cavity injection molding, only 100 atmospheres pressure need be employed in an exemplary extrusion process according to this invention. This exemplary amount of pressure may be used with polyethylene to extrude in 0.1 second at 150° C., and along with the cohesiveness of the thermoplastic material itself, which for example, may be of tubed toothpaste-like consistency, causes the strands in their hot state to hang on the end of the nozzle 45 with an outward and downward bowing. The lower ends of the strands generally do not touch one another but may gradually tend to bow back inwardly. These strands continue hanging in this manner for the short period of time in question. As they are hanging, however, they tend to become more tear drop shaped, enlarging their lower ends and concentrating more heat thereat. The shape and positioning of the strands 78 may vary depending on the angle of inclination of apertures 48, type of material extruded, its temperature, pressure, etc., and their representation in FIGURE 3 may be somewhat idealistic.

While the strands are being extruded, or after their ball shape form has somewhat taken place, pistons 74 and 76 are simultaneously moved inwardly to cause the neck forming section halves 66 and 68 to move inwardly also. As is apparent from the drawings, these two halves have threads on their inner edges, so the neck forming section 62 as a whole may therefore be referred to as a thread mold. In addition to the thread forming part of this mold, these halves each have an integral inwardly projecting part 69 that operates as a scraper or stripper for removing the thermoplastic material from the nozzle 46 as it is withdrawn upwardly through the rear end opening of the female mold.

In greater detail, reference may be made to FIGURE 4 which is a view of FIGURE 1 taken just along the upper surface of thread mold halves 66 and 68, in comparison to FIGURE 5 which shows a view of FIGURE 3 just above the rear end closing sections 70 and 72. With pistons 74 and 76 moved outwardly as is the situation in FIGURES 1 and 4, the circular cutouts forming the strippers 69, as well as their respective thread forming halves 66 and 68, are fully spread apart so that nozzle 46 easily moves downwardly therebetween into and through the rear end opening 59 of the shoulder forming mold section 60. On the other hand, as indicated in FIGURES 3 and 5 when pistons 74 and 76 are moved inwardly, the inwardly projecting ends of the thread molding halves 66 and 68 come into an abutting relationship with each other at their opposite sides of the circular cutouts which form stripper 69. Stripper 69, then tightly encompasses nozzle 46.

The two plates 70 and 72, however, have straight inner edges 80 and cannot therefore, at this time, move inwardly as far as the thread mold sections 66 and 68, so springs 86 push plates 70 and 72 only into a tangentially abutting relation with nozzle 46. This requires relative movement between plates 70, 72 and the thread mold halves 66, 68 which is provided for by a pin 82 that extends upwardly from each of the thread mold halves 66, 68 into sliding relation with respective slots 84 in the plates 70 and 72.

The next step in the process is to start moving the female mold 56 downwardly. First of all, it will be appreciated from the drawings that the female mold is disposed in a matrix 88 including an upper section 90 that may be referred to as a guide block. Downward movement of the female mold 56 is accomplished, as shown in FIGURE 1, by a fluid operated cylinder 92 having a piston rod connected via linkage box 94 and ring 96 to rods 98. This linkage system is shown diagrammatically, and operates in such a manner that it moves the female mold downwardly quite rapidly at first and then slower with heavier pressure. During the first part of its downward movement, the nozzle is effectively withdrawn, as shown in FIGURE 6, from the ultimate rear opening of the female mold, i.e., from between the side strippers 69. As the nozzle effectively withdraws a little further so that plates 70 and 72 under their spring pressure can move further inwardly, these plates close the rear opening of the female mold, movement of these plates relative to the respective thread mold sections 66 and 68 being again allowed by virtue of the pin 82 and slot 84 arrangement.

As the female mold moves downward so that the nozzle is effectively withdrawn upwardly, strands 78 are not only stripped from nozzle 46 by strippers 69, but are effectively pulled up against the inside surface of the female mold. That is, with the exception of the lower ends of the strands, they come into contact with the inner side of the shoulder forming section 60 and are somewhat lengthened up into the neck forming section as the nozzle withdraws and they scraped off thereof. The very lower end of each strand, however, preferably does not touch the female mold at all, and this has its important advantages as later discussed below.

The downward movement of the female mold continues and the tubular body 10 enters into the shoulder forming section 60. As it does, the exceptionally hot lower ends of the strands 78 come into contact with the interior surface 21 of tube 10. This immediately applies heat in this area to the tube so as to heat the tube and enhance fusion thereto. This is generally the result regardless of how far or little, if any, the tube body projects above the mandrel shoulder corner 30. That is, even if there is less projection than illustrated, the hot ends of the strands will heat the end of the tube body even if the strand ends also, secondly, or even firstly, touch the mandrel shoulder 32, which is a possibility in some embodiments of such cases or when the strands 78 have more of an axial than radial component. In the projecting tube body case, further movement of the female mold downward causes the end surface 20 of the tube to become adjacent the shoulder corner of the shoulder forming section 60, and thereafter as the female mold moves downwardly, so does tube 10.

As will be apparent from FIGURE 7, tube 10 is thereby shoved downwardly on mandrel 24 until such time as the female mold 56 comes to a stop by virtue of matrix 88 coming against stop members 100, at which time the bottom end of tube 10 is against base 28 in FIGURE 1. This downward movement of the female mold, particularly the shoulder forming section 60, from the time when the upper surface 20 of the tube 10 becomes adjacent the corner of the shoulder of section 60, causes the hot plastic material not only to be pushed downwardly into the recess 102 that circumferentially rings the upper part of mandrel 24 just below its shoulders, but also pushes the hot plastic material upwardly into the narrower area forming the upper part of the shoulders and threaded neck parts. As will be apparent, this process causes the hottest material to be at the point required therefor, i.e., at the weld point, to effect the best weld, and at the same time causes cooler material to be in the places where cooler material is best positioned, i.e., in the threaded molding area. Cooler material is desired in thread mold area not only to aid molding thereat but because it is difficult to cool the thread molds themselves, whereas on the other hand the shoulder forming section 30 may be cooled, as indicated by cooling channel 104, as may be matrix 90 as indicated by channel 106. Pressure is applied by the female mold for a time generally in the range of 1 to 2 seconds, after which the thread mold sections 66 and 68 are separated and then the female mold and its matrix are pulled upwardly by rods 98. At the same time nozzle 46 is also moved upwardly, and all parts go back into their starting position as illustrated in FIGURE 1. This leaves on the mandrel a finished headed tubular body, which may require further cooling, by air for example.

It was above mentioned that the shoulder forming section 60 and guide block 90 may be cooled by use of fluid in channels 104 and 106, and this fluid may be of any type desired, preferably water. In addition, mandrel 24 may be cooled internally or externally if desired. For example, it may be internally cooled by use of a central pipe (not shown) acting as a bubbler or the like to particularly cool the head end 34 of the mandrel, including the cylindrical end part 36 and shoulders 32. It will be appreciated that together, the outer surface of the mandrel neck 36 and shoulders 32 form a male die that cooperates with the female mold 56 in the compression molding process.

As was previously mentioned relative to FIGURE 2, it is preferred to have the shoulder of the resultant product increase in thickness outwardly, to give more strength at the weld points. To effect this, the shoulder 32 of the mandrel and the corresponding interior surface of shoulder forming mold 60 are non-parallel, being divergent outwardly. This is the preferred arrangement, but these shoulder forming sections may be parallel if desired.

Instead of the recess 102 about the mandrel, the shoulder 32 of the mandrel may have a second slope that is steeper near the corner 30 than adjacent the neck 36, forming an area with the interior surface 21 of tube 10 to give a depending skirt similar to skirt 22 in FIGURE 2, but of slightly different shape. In either situation, more plastic material from the shoulder section is fused with the body 10 on the interior circumferential surface thereof to make a stronger weld. Either this type of embodiment, or the one actually shown, i.e., the one in which a circumferential recess 102 is utilized, may be employed when the thermoplastic material is either polyethylene or vinyl.

It has above been mentioned that the rear end closing section 64 of the female mold 56 includes two plates 70 and 72 which are movable radially to open and close the rear end (upper) aperture of the female mold. Instead of using two plates, of course one may be employed to move radially across the total opening. Further, though springs 86 have been illustrated for causing the closing plates 70 and 72 to be biased inwardly, it will be appreciated that these plates, or a single one which might replace them, could be operated by use of cams or hydraulic actuation. The purpose of plates 70 and 72, as heretofore indicated, is to close the rear end of the female mold, but it is to be understood that these plates need not completely close the mold especially in an embodiment where an aperture is to be left in the top of the resultant head of the container. For effecting such, an upwardly biased or unbiased hole-forming rod (not shown) may extend up from the neck 36 of the mandrel and through a correspondingly sized aperture in the abutting edges of plates 70 and 72 to make a correspondingly sized finished opening in the head end of the container. Under such conditions, plates 70 and 72 still effect a substantial closing of the rear end aperture of the female mold.

After the female mold has been moved upwardly off the newly formed head and tube body, it is desirable to move either the female mold or mandrel out of axial alignment with each other so that the container can be removed from the mandrel by vertical withdrawal. Preferably, the mandrel is one of several that are positioned around a turntable. For example, as indicated in FIGURES 8 and 9, there may be 8 different mandrels 24 disposed at equal intervals around a turntable 108. This turntable is rotatable in the direction indicated by arrow 110, by any desirable means such as rotator 112, to present any particular one of the mandrels successively to turntable positions I through VIII. Upwardly from base plate 103 at respective corners extend four guide posts 105 on the rear two of which sleeves carrying plate 107 and mold 56 are movable up and down by rods 98. The mandrel at position I is in axial alignment with nozzle 46 and female mold 56, to effect in the manner heretofore described the formation and fusing of a head onto the tubular body disposed on the mandrel at that station. In one embodiment, after the female mold 56 has been moved upwardly by rods 98 so that there is head clearance for the movement of turntable 108, that table is rotated one step so that the tube that is on the mandrel that was at station No. VII now is at station No. 1 for having a head molded and fused thereto. This process may be continued, stepping the mandrels clockwise one station at a time and allowing the heads for the new containers to be further cooled by air.

At any one of the stations II through VII, the container may be removed from its mandrel. This may be accomplished in any known manner, as by threadingly engaging the head of the container and vertically removing it from its mandrel. In a preferred example, the removal step is accomplished at station VII, and then the empty mandrel is filled with a new length of tube at station VIII. This filling process whereby a precise length of tube is disposed at a predetermined height on the mandrel may be accomplished in any one of several ways. For example, after a long length of extruded tube has been automatically cut (by means not shown) into proper tube body lengths which fall into an adjacently disposed container from which the tube bodies go into a revolving half-drum or centrifugal table 114 (FIGURE 9), they are thrown into a single line in chute 116 that extends to the turntable loading position VIII. At the end of the chute, there are a pair of touching rollers (not shown) which stop the tube bodies at that point temporarily to effect proper timing thereof onto the mandrels. To load a mandrel, the rollers separate slightly and start turning in opposite directions so as to pull a tube that appears at the end of the chute outwardly and downwardly into a guide that is axially disposed over the mandrel at position VIII. The guide circularly holds a tube body by friction at the proper height, so that the next tube body which the rollers push into the guide pushes the tube body being held therein downwardly and frictionally onto the mandrel then at that position No. VIII, to the right height therefor, as previously discussed with relation to FIGURE 1.

With a multiple station embodiment, faster operation may be accomplished by removing the female mold 56 from the newly formed container before the head thereof fully sets, and then causing that head to be effectively inserted into a second female mold at a second station while the first station is causing a head to be formed on another tube body. Further, this process may be extended to three or more molds, as desired. For example, as indicated in FIGURE 8 there may be a second female mold 118 and a third female mold 120, in which case molds 56 and 118 may generally be termed "rough" molds, while 120 may be termed a "finish" mold. The phases "rough" and "finish" here refer, for example, to an embodiment in which the neck portion of the female molds contains thread forming sections, though the shoulder forming sections of the successive female molds may also be different, and in any case the successive molds cause the form of the molding head to gradually approach the final dimensions desired therefor. Molds 118 and 120 have no rear or upward opening but are otherwise similar to mold 56. They may be secured to plate 107 to move vertically with mold 56, or as shown they may have their own separate fluid cylinders and piston rods 121 for independent or joint operation as desired.

In a specific example, the thread mold for station I may be similar to that shown in FIGURE 10, not considering any stripper portion thereof (such as stripper 69 in FIGURE 1, which actually may be a separate rather than integral part of the thread mold). In FIGURE 10 the two halves 122 and 124 are shown in their abutted position and are movable in opposite direction along their longitudinal axis 126 in any suitable manner, for example by pistons as heretofore described. As shown in FIGURE 9, the longitudinal axis 126 of the thread mold is at an angle of 45° with the vertical. The main difference between the thread mold in FIGURE 10, and the thread mold 62 heretofore described relative to FIGURE 1, is that instead of the thread forming portions being circular, they are made oval for the thread mold in FIGURE 10. When the halves of this mold are closed, the oval will press threads into the hot plastic material substantially to the full depth shown by dotted lines 128 in FIGURE 11. However, in the embodiment being considered, wherein there are several successive female molds, the halves of the FIGURE 10 thread mold are spread apart and the female mold lifted upward before the plastic material fully sets, and in so doing the plastic material deforms approximately back to the full line configuration 130 shown in FIGURE 11.

The thread mold for use in the second female mold 118 of FIGURE 8 may be similar to that shown in FIGURE 12. In this case, the longitudinal axis 132 is horizontal, so as effectively to be at the same relative angle to the threads on the head of the container moved from position I to position II as was axis 126 in position I, since in so moving those threads are rotated with turntable 108 45° which is the angular difference between longitudinal axis 126 and 132. The threads of sections 134 and 136 of the thread mold for female mold 118 are circular as shown in FIGURE 12 with the exact shape and depth as desired for the final configuration for the head teeth, except that they have slight outward openings 138 at the diametrically opposed positions where the two halves 134 and 136 of the thread mold abut. This forms pips on the corresponding parts of the threads on the tube head, but if the corners of thread molding sections 134 and 136 were not formed with their outward openings 138, then the corner edges of the thread molds would cut into the larger diameter 130 (FIGURE 11) to prevent full closure of sections 134 and 136 because of plastic material which would be pushed in between these sections. Except for the pips then formed in the head by the outward openings 138, the threads formed by the second female mold 118 look like those shown in FIGURE 13, i.e., with full depth proper shape.

In order to remove those pips, the third female mold 120 of FIGURE 8 includes a thread mold that has a longitudinal axis 140 disposed vertically as shown in FIGURE 14. The threads of sections 142 and 144 of this thread mold are fully circular and therefore compress the pips of the head resulting from the second station thread mold, into the remaining part of the head to give the threaded neck portion its final shape, as shown in FIGURE 15. The area for the oval shaped thread sections in FIGURE 10 is the same as the area for the circular shaped sections in FIGURE 14, but the FIGURE 12 pips 138 increase that area slightly.

The shoulder forming section 50 of FIGURE 1 has been indicated as having an internal shoulder surface that is non-parallel to the shoulder forming surface of the mandrel. In the multiple female mold embodiment, this is still preferably the same situation, with the divergence therefore in the first female molde 56 being even greater than the case in which there is only a single female mold. This provides for a larger hot mass of plastic to rest longer on the cold tube body and effect a better weld. The larger amount of plastic material is gradually squeezed upwardly by the successive female molds 118 and 120.

In the multiple female mold embodiment, the shoulder molding section of the first female mold may have its vertical interior wall recessed so that at station I the tube body will not be pushed downwardly on the mandrel at all, but more time will be given for the hot plastic material to warm up the tube body before the material comes into contact with the cooler mandrel at station II.

It is preferable to have the second and third molds at very low temperatures, for example 10°–15° C., to effect cooling, but the temperature of the first mold may be held higher, say in the 50°–100° C. range, to help maintain the plastic material hot and effect a better weld. Contact time between tube and plastic in station I is much less than in the next stations, so the higher temperature at station I is desirable but yet the temperature thereat cannot be so high as to prevent the desired degree of shaping and setting.

The cycling time for a multiple female mold embodiment may be about 2½ times faster than that of a single female mold embodiment, meaning that turntable 108 may be rotated 45° about once every second, giving approximately 3600 finished tubes per hour instead of about 1500 per hour as may be effected by a single female mold embodiment.

In general, the invention described herein, taking the specific embodiment wherein the tube body initially extends above the shoulder corner of the mandrel, has the substantial advantages now considered. With an open compression mold, the tubing can be extended far enough above the mandrel shoulder corner until an unobstructed transfer of the thermoplastic material against the inside of the tube body, or any other designated joining portion, can be guaranteed. This prevents thermoplastic material getting over the edge of the tubing to its outer side during closing of the female mold. By this embodiment of the invention it is assured that the extruded thermoplastic material is disposed so that its hottest part comes initially into contact with only the inside part of the extended tube body so as not to touch the mandrel or shoulder forming section of the female mold, thereby putting the greatest amount of heat where it is necessary. This brings the hot plastic material to the point of potential juncture without further temperature loss. The union of the tube head being formed and the inside of the tubing is practically achieved by the temperature of the hot thermoplastic material transferred from the measuring device extruder. During the compression process that follows, the excess plastic material, which has been displaced upwards, comes into contact with the cooled walls of the shoulder forming section 60, so that when the plastic material is forced into the neck part of the female mold, the material is already somewhat cooled off, but still in decent formable condition. This is desired, as previously indicated, because the neck part of the mold includes components that are movable and therefore more difficult, generally speaking, to cool. With this invention, the thermoplastic material is hottest at those points where a junction must take place, and at the same time the plastic material is coolest at those locations where for forming purposes a lower temperature is required than at the junction seam and where movable parts construction prevents good cooling. These advantages exist over injecting type molding procedures, and a further advantage of the economic nature exists in this invention in that the expense of a compression die are considerably less than the cost of an injection die. The transfer of the thermoplastic material against the inside of the tubing aids the joining action in that the thermoplastic material can be dispersed with less material movement from the inside of the tubing to the periphery of the tube. The junction improves as more points on the tube's inner periphery are contacted by thermoplastic strands. Hence, more than one ring of openings 48 may be disposed at the lower end of the nozzle or extruder 46. By a further ring of openings thereat, additional points of contact by the added thermoplastic strands can be placed advantageously between the points from the first ring. By the increase of openings, the material displacement at the periphery lessens, whereby the fusing and joining probabilities are improved. As a matter of fact, the nozzle 46 may be made to extrude the thermoplastic material from all radial points, as through a continuous opening around the side of the nozzle near its lower end, to cause a resultant continuous skirt-like mass of thermoplastic material to result. The pressure and cohesiveness along with the temperature of the extruded thermoplastic material would effect a flared skirt similar in cross section to the cross section of any one of the illustrated strands 78. In a broad sense, therefore, the individual strands 78 form the outline of a flared skirt, which becomes more and more of a unit circumferentially as the number of strands 78 increases towards infinity.

As previously indicated in this specification, the process and apparatus of this invention are not limited to producing tubes, but may be applicable also for other hollow articles with or without welding being involved. For example, one-piece, screw-on, pointed nose, plastic dispensing caps, like those used on catsup and mustard dispensers for example, or other type caps may be advantageously made in accordance with this invention. In this respect, reference is first made to FIGURES 16 and 17, for purposes of showing the production of a cap 150, with an inside thread, for capping containers (not shown). Nozzle 152 is similar to nozzle 46 of FIGURE 1, and is disposed on the forward end of a cylinder 154. In this cylinder, a measuring device like that previously described and including piston 155 is provided for dispensing a measured amount of the synthetic thermoplastic material 156 through the plurality of inclined apertures 158 on the forward end of nozzle 152.

Mandrel 160 has an upper end 162 which shapes the inside of the cap to be molded. The outside of the cap to be molded is initially shaped partially by shoulder-shaping section 164 of the overall female mold. This mold section 164 is secured to a guide block 166, and moves vertically with it in accordance with the movements of piston rods 168 connected to the pistons 170 of cylinders 172. The pistons in cylinders 172 are displaced by means of pressure which flows to and from the cylinders via ducts 174. These cylinders are fastened onto the machine frame 175. Two further cylinders 176 are fastened tightly respectively to the cylinders 172, and their respective pistons 178 move the nozzle housing 180 by means of rods 182, slides 184 and pegs 186. The inside diameter of housing 180 corresponds to the outside diameter of the extruding nozzle 152, and is slidably adjustable thereon in the direction of the longitudinal axis of the nozzle. Housing 180, as seen in FIGURE 16, normally sets upward on the nozzle, so as not to cover the openings 158. On the other hand, in FIGURE 17, it will be noted that the housing is forwardly disposed so as to shut off openings 158. In being lowered to shut off these openings, the housing strips off the strips or strands of synthetic material that are extruded from the openings 158.

In guide block 166, ducts 188 may be provided for continuous cooling, in the manner heretofore indicated. Mandrel 160 may be similarly cooled, if desired.

Further disposed in guide block 166 are two cylinders 190, with respective pistons 192 and piston rods 194, for the purposes of moving flanges 196 and 198 toward and away from each other in a radial plane, by the supply and withdrawal of pressurized fluid via ducts 200. These flanges 196 and 198 are a part of the overall female mold, and effect formation of the neck or pointed nose portion of cap 150, as well as close the mold entirely at its rear or upward opening, though a small pin-point aperture may be left is desired, as by the upward intrusion of a pin or the like from the pointed nose portion of mandrel 160.

On mandrel 160, cut-off or mold closing ring 202 is affixed in a longitudinally adjustable position. Springs 204 are disposed between ring 202 and a ring 206 which is immovably secured on mandrel 160 by screws 208.

The apparatus of FIGURES 16 and 17 operates as follows. In the initial position as shown in FIGURE 16, guide block 166 presses on the stop block 210. The slidable neck shaping halves 196 and 198 are disposed outwardly, i.e., are separated, by virtue of pistons 192 being held outwardly by pressure. Initially also, pistons 178 are held under pressure so as to prevent movement of housing 180 in the direction of guide block 166. Mandrel 160, which may be situated on a revolving device such as the turntable referred to above relative to FIGURES 8 and 9, or on a conveying device (not shown) movable in a parallel plane, is brought into working position and, by means of a sighting device (not shown), is secured against moving sidewise or axially. At this time then, cylinder 154 with its piston 155, is filled with a mass of synthetic material 156 and brought to a temperature, for example 160° C., at which the synthetic material is forced out through openings 158. As the piston 155 lowers, a measured amount of plastic, moldable, synthetic material is extruded through openings 158 as strands 210. Next, the pistons in cylinders 178 are operated and cause housing 180 to move downward toward mandrel 160, whereby the lower edge of the housing 180 cuts off or strips the strands of synthetic material from the outer side of the openings 158 on nozzle 152. At the same time, or slightly subsequent if desired, cylinders 172 are operated so as to move guide block 166 downwardly toward mandrel 160. This causes the strands 210 to lie against the inside surface of the female mold. At the same time as the guide block is moving downward, the neck shaping halves 196 and 198 of the female mold are moved toward each other so as to shut off the rear end opening of the molding cavity. This cut-off ensues as soon as flanges 196 and 198 have moved downward past the lower ends of nozzle 152 and housing 180. The entire female mold, as formed by the shoulder and neck shaping portions thereof, begins to shape the strands of synthetic material by a pressing process as it works in conjunction with the head of mandrel 160. As soon as the mold matrix 164 touches ring 202 around the mandrel, the lower end of the space or cavity in the female mold is closed. The final casting of the plastic cap 150 is attained when ring 202, yielding to the pressure of springs 204, strikes pegs 212 disposed in respective slots in ring 202. FIGURE 17 shows the final position.

The embodiment disclosed relative to FIGURES 16 and 17 may cause the resultant cap 150 to be shaped and set in its final dimensions, or, on the other hand, the male die and female mold may not shape the cap into the specific measurements of the final product to be manufactured, but somewhat larger measurements. In this latter case, then, the male and female molds in FIGURE 17 will be separated before the plastic material completely sets, and the male die will then be made to cooperate with a second female mold to effect a dimensioning closer to final measurements desired, all in accordance with the multiple female mold embodiments above described relative to FIGURES 8 and 9.

The embodiment shown in FIGURES 18 to 21 relates to the production of another type cap, for instance, a bottle cap in a two-stage process. The machine for producing such caps comprises a plurality of mandrels arranged in spaced relation on a turntable and at least two molds with which the mandrels of the turntable successively come into engagement.

In FIGURE 18 reference numeral 301 indicates a mold half serving to produce in cooperation with a mandrel 312, a blank in the form of a circular disc which in the second operation is to be formed into the cap. A tubular extrusion nozzle 302 projects into the center of the mold half 301 to extrude into the space or cavity of this mold half thermoplastic material to form the blank identified at 303 (FIGURE 19). Mold half 301 comprises a sleeve 304 engaging into a circular groove 305 to be guided for axial movement therein. The internal surface 306 of the sleeve 304 together with the annular surface 307 defines the cavity of the mold. Sleeve 304 is provided with a plurality of axial bores 308 arranged in spaced relation about its circumference. Bores 308 contain compression springs 309 which are supported at the upper end of groove 305 and which have a tendency to hold the sleeve in the position shown in FIGURE 18, i.e., in the foremost or lowest position of this sleeve determined by suitably arranged stops not shown.

In its upper portion 310 the extrusion nozzle 302 is provided with a device for feeding a predetermined amount of plasticized thermoplastic material used to form the blank. In the vicinity of its lower end the injection nozzle has a plurality of spaced extrusion openings 311 connected with the feeding devices not shown through a channel in the interior of the nozzle. Mold 301 cooperates with a mandrel 312 arranged on the turntable (not shown) and carrying a sleeve 313 slidably guided thereon. As will be seen from FIGURE 20, this sleeve 313 is supported on a stop ring 316 on mandrel 312 via a plurality of compression springs 314. Compression springs are arranged in bores 315 of the sleeve 313. The stop ring 316 is longitudinally adjustable on the mandrel 312 and may be secured thereon in a predetermined position by means of a setting screw 317. FIGURES 18, 19 and 20 show sleeve 313 in its inoperative position in which the latter is held by abutments not shown which prevent further upward displacement of this sleeve relative to the mandrel under the biasing force of springs 314. In its upper portion sleeve 313 is provided with an enlarged bore 318 defining together with the mandrel 312 an annular chamber 319, the purpose of which will be described in more detail in connection with FIGURES 20 and 21.

The position of the parts shown in FIGURE 18 corresponds to the beginning of the extrusion process. In this position the extrusion nozzle 302 projects through bore 320 in mold 301, the openings 311 of the nozzle being situated outside of bore 320 to permit escape of plasticized material in the form of strands 321, depending or projecting from these openings. As soon as the extrusion of these strands has taken place, mold 301 supported in an axially movable slide will be axially displaced with respect to the mandrel so as to approach the latter. Consequently, the interior surface of bore 320 closes the openings 311 on nozzle 301 while simultaneously stripping off the strands 321 of plasticized material therefrom. At the same time, the mold cavity is closed (FIGURE 19) due to the engagement between sleeve 304 with the bevelled annular surface 322 of mandrel 312.

It is to be noted that contact between sleeve and mandrel, and thereby the closing of the mold cavity, is effected prior to a displacement and a distribution of the plasticized material, i.e., prior to a pressure being built up in the mold cavity due to this displacement. Consequently, when such pressure as caused by a further closing movement of the two mold halves relative to each other sets in, the escape of plasticicized material from the cavity is prevented.

FIGURE 19 shows the position of parts when the mold is fully closed, the end face of injection nozzle 302 closing off bore 320 and being flush with the annular surface 307. Due to the fact that the opening through which the plasticized material is introduced into the mold is closed off by the extrusion nozzle, no additional members or parts are required to effect such closing. As soon as the blank has been formed by the complete closure of the mold and has been cooled to a predetermined temperature by the contact with the interior surfaces of the mold cavity, the mold is opened by retracting mold half 301 by means of its supporting slide. The blank located in the mold cavity is ejected therefrom by means of the extrusion nozzle 302, retaining this blank in position on mandrel 312. Depending upon the type of blank to be formed, suitable depressions, i.e., bores or grooves, may be formed in the end face of mandrel 312 into which the plasticized material forming the blank penetrates to retain the latter on the mandrel when the mold is being opened. Subsequently, the injection nozzle is retracted from the upper side of the blank but a short distance to permit free movement of the blank together with the mandrel upon rotation of the turntable in its step by step movement to bring the blank below the mold for forming from this blank the finished cap as described hereafter.

In FIGURES 20 and 21 representing the second station, a mold 323 is used for forming from the blank 303a finished cap. This mold cooperates with the mandrel carrying blank 303 and is supported in a slide 330 by means not shown. Slide 330 is provided with a circular opening 331 for slidably receiving and guiding mold 323 for axial movement therein. Intermediate the bottom of opening 331 in slide 330 and a shoulder 332 formed at the periphery of mold 323 there is arranged a spring 333 biased to maintain mold 323 in its lowermost position (relative to slide 330) shown in FIGURE 20. The shape of the cap to be formed from the blank 303 is defined on the one hand by a cavity 325 in mold 323, mandrel 312 and bore 318 in sleeve 313. The cavity 325 comprises an enlarged portion 326, the diameter of which is adapted to the exterior diameter of sleeve 313. Between bore 325 and enlarged portion 326 an annular shoulder 327 is formed which in the closed position of the mold shown in FIGURE 31 abuts against the end face 328 of sleeve 313. However, before a forming of the blank 303 takes place, this abutment of shoulder 327 and end face 328 has already taken place, i.e., sleeve 313 has engaged enlarged portion 326 so that the cavity of the mold is closed on all sides despite the fact that its volume does not as yet correspond to that of the finished article. Due to the relative movement or displacement between mandrel and mold 303, the cavity is reduced with respect to its volume, thereby pressing material from the blank over the sides of the mandrel into the annular chamber 319. In the position of parts shown in FIGURE 21, the cap 324 has reached its final form and has been subjected to a certain compression. During this compression phase the material forming the blank is subjected to intensive cooling so that upon opening of the mold and removal of the cap from the mandrel the former will retain its shape apart from a slight shrinking.

In order to permit to remove the cap from the mandrel after opening of the mold and stepwise movement of the turntable, the mandrel may taper slightly towards its upper end so as to facilitate sliding off of the cap. The sleeve 313 may be retained in its lowermost position while the mold is opened and the turntable carries out its movement. After the turntable has come to rest again with the mandrel carrying the cap in an advanced position, the cap may be ejected by means of the sleeve from the mandrel either under the action of the springs 314 or by suitable actuating means for this sleeve displacing the latter into its upper end position shown in FIGURE 20. Of course, the cap may be removed from the mandrel also by means other than the aforementioned sleeve, for instance, by means of suitable gripping devices engaging the cap at its upper end and pulling it off the mandrel. These gripping means may be supported in their action by the spring-pressed sleeve 313.

In connection with the process of forming a cap described with respect to FIGURES 18 to 21, it is to be noted that as will be seen from FIGURES 18 and 19, the blank is formed to such a shape that it does not laterally engage the mandrel. In the specific embodiment the blank is formed as a circular disc. Due to the fact that mandrel and blank are in contact with each other only at the end face of the former, and that the flow of plasticized material to the sides of the mandrel is prevented, the prior art difficulty of bending the mandrel out of its axis into a non-concentric position with respect to the mold is avoided. Formerly, this displacement of the mandrel out of its axis occurred frequently due to a non-uniform disposition of the material injected into the mold cavity, causing reaction forces on one side of the mandrel to be larger than those on the other side with a consequent displacement of the mandrel and as a result a non-uniform wall thickness of the article to be produced. It is furthermore to be noted that with the described process the blank arrives in the position shown in FIGURE 20 in fully concentric relation to mandrel as well as to mold. Consequently, the forming of the finished article, i.e., the cap from the blank, may be effected with a uniform displacement of material on all sides of the mandrel and consequently with a fully uniform configuration and wall thickness of the finished article.

It will, of course, be understood that instead of arranging a plurality of mandrels on a turntable these mandrels may also be positioned on a stationary or non-rotating table while, on the other hand, arranging a plurality, i.e., several groups of molds, on a turntable cooperating with and being concentric to the mandrel carrying table. The process described in connection with FIGURES 18 to 21 may be applied also to the production of articles other than caps, for instance, for the production of tubes or other hollow bodies. If tubes are to be formed by molding a head onto a previously produced tube body, the first step of forming a blank described in connection with FIGURES 18 and 19 will, of course, also include the welding of this blank to the preformed tube body along the periphery of the former as will be understood by those skilled in the art.

With regard to the centering feature described in connection with FIGURES 18-21, it should be noted that this feature is readily adaptable to the female mold 56 of FIGURE 1, in the manner indicated in FIGURE 22 for example. In this latter figure, the shoulder forming section 60' of the female mold includes an annular depending skirt 340 which protrudes downwardly from the lower surface of section 60' a sufficient length to effect centering of mandrel 24 at least by the time that any pressure begins building up against the plastic strands 78. In other words, the lower end 342 of the depending skirt is at least level, if not below, the maximum mandrel diameter line 344, by the time the female mold has moved downward over the mandrel to the point where the mandrel shoulder 346 begins pressing against the plastic material 78 to effect circumferential and longitudinal dispersion thereof.

In the embodiment illustrated in FIGURE 22, the mandrel has a second shoulder 348 that has a relatively steep incline for a given, relatively short, axial distance. This shoulder changes to the less steep shoulder 346 at line 350, and it may be noted that in this embodiment, tube 10 has its upper end surface 20 level with line 350 rather than protruding upwardly therefrom as in the FIGURE 1 embodiment. In the FIGURE 22 embodiment, there is no downward movement of tube 10 on the mandrel during the molding process, for tube 10 is initially positioned on the mandrel at the same height illustrated in FIGURE 22, and as shown in the final compression step of FIGURE 23, the relative heights of tube 10 and the shoulder dividing line 350 are still the same.

As soon as the plastic material of strands 78 is pressed into the annular V defined by shoulder 348 and the inside end surface 21 of tube 10, the plastic material which is in the lower half or so of this V cools quite rapidly due to its exceptional thinness. This makes for a wedging effect by which the tube 10 is pressed outwardly against the inside surface of the depending skirt 340, not only aiding in the centering of the mandrel but also preventing plastic material from "flashing" over onto the outside surface of the tube 10, while at the same time the hot tip of the strands 78 fuse and weld themselves to the upper end surface 20 and upper part of the interior surface 21 of tube 10. The final disposition of the female and male portions of the mold as well as the shape of the tube and head welded thereto via the process described relative to FIGURE 22, is illustrated in FIGURE 23.

It is to be understood that the depending skirt feature of FIGURE 22 may be employed with a circumferential recess of the type shown in FIGURE 1, or with a tube which projects upwardly beyond the shoulder line 350, since the different features of the invention may be utilized in any desired arrangement.

The embodiment shown in FIGURES 24 to 28 relates to the production of a tube-type container in a multi stage process. As described in connection with the embodiment of FIGURES 18 to 21, the machine for producing such containers comprises a plurality of mandrels arranged in spaced relation on a turn table and at least two molds with which the mandrels of the turntable successively come into engagement. Additionally and in contrast to the embodiment of FIGURES 18 and 21 the machine of this embodiment comprises a heating unit arranged at a station intermediate the two molding stations in the circular path of the mandrels described by the rotation of the turntable.

In FIGURE 24 reference numeral 401 indicates a holder arranged for downward and upward movement in a machine frame not shown. Holder 401 is provided with a cylindrical opening 403 containing an open female mold 405 constituting a blank forming mold. Mold 405 comprises a relatively stationary mold part 407 abutting against an inwardly directed flange 409 in opening 403. Mold part 407 forms an annular stripping member 411 containing a central bore 413. Stripping member 411 of mold part 407 engages with a central bore 417 of a relatively movable mold part 415 and guided for such movement in opening 403. Mold part 415 contains a number of axial bores 419 arranged on circle in equally spaced relationship. Each of the bores 419 contains a compression spring 421 abutting against mold part 407 and tending to maintain mold part 415 in the position indicated in FIGURE 24. The interior surface of bore 417 of mold part 415 defines together with the lower inwardly inclined face 423 of stripping member 411 a mold cavity 425.

An extrusion nozzle 427 projects through bore 413 into mold cavity 421 and is provided in its upper portion 429 with a device (not shown) for feeding a predetermined amount of plasticized thermoplastic material. In the vicinity of its lower end the extrusion nozzle has a circumferential extrusion slot 431 connected with the feeding device in its upper portion 425 through a channel (not shown) in the interior of the extrusion nozzle 427. In the position shown in FIGURE 24 extrusion slot 431 is situated in mold cavity 425 and a predetermined amount of thermoplastic material required for forming a head blank is shown to be extruded as an annular (circumferential) bead 433 depending at the exterior surface of nozzle 427 from slot 431 and being contained in mold cavity 425. Since the extrusion opening in nozzle 427 is in the form of an uninterrupted circumferential slot, the material extruded is substantially evenly distributed and forms a continuous bead 433.

Situated below mold 405 and in a common vertical axis therewith is a cylindrical mandrel 435 supported by a turntable (not shown). A tube section 437 made of thermoplastic material is seated on mandrel 435 and has its upper end 439 located in the region of a frusto conical shoulder portion 441 of the mandrel. Mandrel 435 terminates in a tapered neck portion 443 and is provided with a recessed flange 445 at the lower end of shoulder portion 441 to define with the upper end of tube section 437 an annular space 447. Shoulder portion 441 is interrupted by an annular groove 449 of dove-tailed cross section as shown in more detail in FIGURE 26.

In the position shown in FIGURE 25 holder 401 is carrying out a downward movement relative to the machine frame and mandrel 435, respectively. Simultaneously with the downward movement of holder 401 and mold 405 carried by such holder, extrusion nozzle 427 effects a downward movement until its lower extremity abuts against the tapered neck portion 443 of mandrel 435. While movement of nozzle 427 is stopped in this position, the downward movement of holder 401 and mold 405 continues and the consequent relative movement of stripping member 411 of mold part 407 with respect to nozzle 427 shears off the annular bead 433 at the slot 431 of nozzle 427 and displaces such material downward along this nozzle and towards mandrel 435. In the course of the downward movement of mold 405 mold part 415 abuts with its lower end against shoulder portion 441 of mandrel 435 and as a consequence mold cavity 425 is closed as shown in FIGURE 25. It will be noted that the diameter of the mold cavity is just large enough so that groove 449 may communicate therewith in the closed position of the mold.

Upon further downward movement of holder 401 and mold part 407 relative to extrusion nozzle 427, mandrel 435 and mold part 415 from the position of FIGURE 25 into the position shown in FIGURE 26, the volume of mold cavity 425 decreases continually to stripping member 411 penetrating deeper and deeper into central bore 417. This movement of mold part 407 displaces the annular bead 433 further along extrusion nozzle 427 and tapered neck portion 443 towards shoulder portion 441 of mandrel 435 compressing at the same time springs 421 located in bores 419.

Since the predetermined amount of thermoplastic material extruded from the nozzle 427 corresponds in its volume to the combined volume of cavity 425 in the position of FIGURE 26 and groove 449, annular bead 433 of FIGURE 24 will be formed into the head blank indicated at 451 in FIGURE 26 while the remainder of the material will penetrate into groove 449 and substantially fill the latter for a purpose explained hereafter. It will be noted that substantially no pressure is required to form the material in the annulus shape of head blank 451 and except for the material displaced into groove 449 where immediate cooling and solidification of the material is desired, the material remains in the form of a compact annulus surrounding neck portion 443 of mandrel 435. Consequently the material forming the head blank 451 will retain a large amount of its heat and will not solidify. This is also due to the fact that the steps explained so far may be carried out within a fraction of a second and that immediately after the position of FIGURE 26 has been reached the movement of holder 401 may be reversed so that the mold 405 will be retracted. Such movement will be carried out in two phases since mold part 415 will remain stationary on mandrel 435 together with extrusion nozzle 427 under the influence of springs 421 until holder 401 has reached the position of FIGURE 25 relative to this mold part. An abutment on holder 401 (not shown) will then engage with mold part 415 and lift the same away from mandrel 435 during the continuing upward movement of holder 401 into the position of FIGURE 24. Simultaneously with the upward movement of holder 401 extrusion nozzle 427 will be retracted so as to take up the position of FIGURE 24 for the next blank forming operation. It will be noted that the material embedded in groove 449 will retain the head blank 451 in position on mandrel 435 during the upward movement of mold 405 due to the rapid solidification of the material in such narrow retaining means and the dove-tailed cross section of the latter.

Reference is now made to FIGURES 27 and 28 illustrating the further steps for producing a thermoplastic tube. It will be noted that these steps are carried out at two successive stations of the mandrel 435 in the course of the stepwise rotation of the turntable. In FIGURE 27 a heating station 455 is shown in operative position with respect to mandrel 435 carrying head blank 451 and tube section 437. Heating station 455 comprises an electrical induction coil 457 connected to a suitable source of electrical current. A metallic heating element 459 extending through the center of coil 457 is heated by induction and transmits its heat to an inverted cup shaped member 461 integral with element 459 and located below coil 457. Member 461 carries a heating ring 463 forming an outer rim 465 at the lower end of such cup shaped member and surrounding the upper end portion 467 of tube section 437. Cup shaped member 461 completely surrounds the exposed surfaces of head blank 451 and its heat is consequently transmitted to these surfaces by radiation in a very effective manner. The lower end face of cup shaped member 461 is recessed at 469 forming an inner rim 471 and preventing direct contact between end portion 467 and cup shaped member in the operating position of heating station 455 which is suitably supported by the machine frame and may be retracted in an upward direction to permit movement of the mandrel 435 to the station shown in FIGURE 28 by the stepwise rotation of the turntable. The heat imparted by radiation to head blank at station 455 is sufficient to facilitate the subsequent molding and fusing operation and to cover possible heat losses at the blank forming station of FIGURES 24 to 26.

The molding and fusing station 475 illustrated in FIGURE 28 generally comprises a tool support 477 carrying three cooperating mold parts.

Secured to a plate 479 suitably attached to support 477 is a cylindrical mold part 481 having a planar lower face 483 and a centrally located pin 485 extending downwardly therefrom. Support 477 further carries two laterally movable slides 487 defining together a threaded bore 489. Finally support 477 carries a ring shaped mold section 491 comprising a cylindrical opening 493, a tapered shoulder portion 495 and a neck opening 497 of reduced cross section. To facilitate introduction of mandrel 435 carrying tube section 437 into mold section 491 the entrance to opening 493 is bevelled as at 499. During the further insertion of mandrel 435 into mold section 491 material of the reheated head blank 451 (FIGURE 27) will be downwardly displaced by tapered shoulder portion 495, flow into space 447 and fuse with heated upper end 467 of tube section 437 at the internal surface and the end surface thereof. The remainder of the material which is not required for forming shoulder 496 will be pressed into threaded bore 489 in slides 487 to form a corresponding open ended, threaded neck portion 498.

It will be noted that no material which has been in contact with a surface of mandrel 435 in a previous operation such as during forming of the head blank, requires displacement in the forming of the shoulder and neck portion which ensures uniform flow of this material and complete fusing thereof with tube section 437.

The embodiment shown in FIGURES 29, 30 and 31 illustrates a modified manner of producing a head blank as compared with the embodiment of FIGURES 24 to 26.

In FIGURE 29 reference numeral 501 indicates an open end female mold seated in a holder 503. A tubular extrusion nozzle 505 projects into a cylindrical cavity 507 of mold 501 through a central bore 509 thereof. Mold 501 comprises a circular cutting or scraping edge 511 surrounding extrusion nozzle 505. Scraping edge 511 is formed by a rounded annular groove 513 in the bottom portion 515 of mold 501. A plurality of nozzle bores 517 arranged on a circle in equally spaced relation, extend through bottom portion 515 and exit into annular groove 513 while their upper ends are connected via a manifold system 519, an air pipe 521, and a valve 523 to a source of compressed air, such as a pump 525.

In its upper portion 527 extrusion nozzle 505 is provided with a device for feeding a predetermined amount of thermoplastic material (not shown). In the vicinity of its lower end nozzle 505 forms a circumferential slot 529 communicating through a channel in the interior of nozzle 505 with the feeding device (not shown) in upper portion 527. As will be seen from FIGURE 29 extrusion of a measured amount of thermoplastic material is effected through slot 529 so as to form in cavity 407 an annular bead 531 depending from the slot at the circumference of nozzle 505.

Situated below mold 501 and in a common vertical axis therewith is a cylindrical mandrel 533 supported by a turntable (not shown). A tube section 535 of thermoplastic material is seated on mandrel 533 and has its upper end located in the region of a frusto conical shoulder portion 537 of the mandrel. Mandrel 533 terminates in a tapered neck portion 539 and is provided with a recessed flange 541 at the lower end of shoulder portion 537 to define with the upper end of tube section 535 an annular space 543.

In the position indicated in FIGURE 30 mold 501 has effected a downward movement together with its holder 503 under the influence of means not shown. Simultaneously extrusion nozzle 505 has carried out an upward movement with the result that the annulus 531 is scraped from the outer face of nozzle 505 by cutting edge 511 and transferred into the annular groove 513 of mold 501.

Further downward movement of mold 501 brings the latter into the position shown in FIGURE 31 in which mandrel 533 with its tapered neck portion 539 penetrates into cavity 507. In this position mandrel 533 is ready to receive on shoulder portion 537 the annulus 531. Transfer of the annulus 531 from the mold 501 to the mandrel 533 is effected by opening of valve 523 and emitting compressed air from pump 525 via pipe 521 and manifold system 519 into nozzle bores 517. Due to the admission of compressed air to these bores pressure is built up in groove 513 at the rear of annulus 531 and due to its paste like consistency the latter is ejected from the groove through cavity 507 and on to the shoulder portion 537 of mandrel 533 facing the open end of this cavity. Compressed air from bores 517 will escape substantially through central bore 509. A subsequent lifting of holder 503 will bring mold 501 back into the position shown in FIGURE 29 and permit mandrel 533 to be moved into subsequent stations such as the heating station shown in FIGURE 27 and the molding and fusing station of FIGURE 28 to produce a thermoplastic tube from the annulus 531 forming a head blank and from the tube section 535 carried by this mandrel in a manner described before.

One of the adavantages of this invention over an injection molding procedure is that thinner pieces may be molded by this invention. In an injection process wherein the molding cavity is of final dimensions during the time that the material is being injected thereinto, the minimum thickness of a piece to be molded thereby is governed by the flow area of the plastic material. With the cavity already closed during an injection process the liquid plastic material immediately flows against the cooler metal walls of the mold and at the thinner parts of the cavity the liquid plastic soon becomes cool and tends to solidify and block the flow of plastic material. However, in accordance with the present invention, the contact cooling area, i.e., the area which the cohesive plastic material initially contacts, is relatively small, and only approaches the injection process cooling area during the dispersion and compression times.

Another advantage of this invention is that the plastic material as it is disposed into the female mold is in a cohesive condition, rather than in a liquid condition as in prior art injection processes. Because of this, the plastic material can be and is at a lower temperature than the liquid plastic of an injection process. This means that the lower temperature cohesive extrusion will cool faster but yet produce a better weld. In addition, faster cooling means faster production. Of course, as has been previously indicated, less pressure is required to extrude the plastic material in a cohesive condition, than is required by a liquid injection process with a fully closed mold, since in accordance with this invention the female mold has its internal space or cavity enlarged if not completely open as is preferred.

Thus there has been disclosed a process and apparatus which provides for all the objects and advantages, as well as the product, heretofore described. Those of ordinary skill in the art will appreciate, after reading this disclosure that modifications other than those herein described may be effected. Therefore, it is believed that the invention should be limited by the scope of the appended claims, and not by the details of this disclosure.

What is claimed is:

1. A plastic forming process comprising the steps of placing extruder means within an open female mold and disposing simultaneously a plurality of hot strands of cohesive thermoplastic material spacedly around the inside surface of the open female mold, said strands being extruded in a substantial acute angle to the vertical into the space within said female mold by a vertically disposed extruder extending into said space by way of an upper opening in said mold, moving said mold toward a male die to remove said strands from the extruder as the extruder exits from the mold by way of said opening to effect the disposition of the strands around said mold, closing said opening, and closing said mold with the aid of the male die to compress said strands into a molded article.

2. In the process of making tubular thermoplastic containers by molding and fusing a head to an end of a tubular body, the improvement including the steps of placing a plurality of discrete hot strands of cohesive thermoplastic material partially against the sides of an open female head mold, said hot strands having outer ends which are closer to the end of said body than are the remaining portions of said hot strands, and said outer ends being disposed by said placing step out of contact with the sides of said open female head mold, then relatively moving said tubular body and mold toward each other to make the said outer ends of the strands touch and heat an end of said body, and then closing said mold to form a head from said strands and to further fuse and mold said head onto said body.

3. In the process of making tubular thermoplastic containers by molding and fusing a head to a tubular body, the improvement including the steps of causing a plurality of hot strands of cohesive thermoplastic material separately to extend from an extruder into the open space of an open head mold, said hot strands having outer ends remote from the extruder and in proximity of an end of said tubular body, removing said strands from said extruder while effectively drawing the extruder out of said mold and placing the strands, with the main exception of their outer ends, against the sides of said mold, moving said tubular body and said mold with said strands toward each other to cause the said outer ends of the strands to touch an end of said tubular body to heat the latter, and then closing said mold to form a head from said strands and to further fuse and mold said head onto said body.

4. In the process of making tubular thermoplastic containers by molding and fusing a head to a tubular body, the improvement including the steps of moving an extruder into the space in an open female head mold, causing a plurality of discrete hot strands of cohesive thermoplastic material to hang from said extruder into the space in said mold, effectively drawing said extruder from said mold while scraping said strands therefrom and laying them, with the main exception of the lower end of each, around the inside surface of said mold, then relatively moving said tubular body and said mold toward each other to cause the said lower ends of said strands first to touch an inside end of said tubular body to fusingly heat the latter, and then closing said mold under pressure to further fuse and mold said head onto said body.

5. A process as in claim 1 including a finishing molding operation comprising opening said mold before said molded article completely sets, and forming said molded article into a finished article with a second female mold which is closer to final configuration than the first-named female mold.

6. A process as in claim 5 including three successive thread molding operations for forming threads on said molded article comprising forming the threads on said molded article in an oval shape with the aid of the first mentioned female mold, removing the molded article therefrom as aforesaid and disposing same in the said second female mold to shape the threads into circular form with diametrically opposed pips, and then removing the molded article from said second mold before the molded article fully sets and subjecting it to a third female mold for pressing said pips into the circular formation of said threaded head.

7. Apparatus for molding and welding a head to a tubular body to produce thermoplastic containers comprising a female mold having an access aperture at its upper end, a male die vertically disposed for receiving said tubular body, said mold being vertically positioned spacedly above said die and movable downwardly onto the die by moving means, means for spacedly disposing hot strands of cohesive thermoplastic material longitudinally on the inside surface of said female mold with outer ends of the strands being out of contact with the mold, said outer ends of said strands being the ends most remote from said hot strand disposing means, said disposing means further comprising a vertically depending nozzle having a ring of discrete orifices at its lower end, said nozzle being movable vertically through said aperture for causing said strands to exude and separately hang from said orifices in the space in the mold, and including means for effectively separating said nozzle from said mold through said aperture, means for disjoining said strands from said orifices as the nozzle and mold separate, means for substantially closing said access aperture as the said nozzle is separated from the mold, and means for moving said die and said mold relatively toward each other to cause said outer ends of the strands to heat said tubular body and to weld thereto a head formed from said strands by the die and the mold moved together.

8. Apparatus as in claim 7 wherein said orifices extend at a substantial acute angle with the vertical.

9. Apparatus for molding and fusing a head to a tubular body to produce thermoplastic containers comprising a mandrel having a shouldered head end, said tubular body being disposable on said mandrel with one end adjacent said shouldered head end of the mandrel, a female mold having a shoulder forming section and a neck forming section having an open rear end and a movable rear end closing section, means extendable through the open rear end of said female mold into the space inside the mold for extruding thereinto hot strands of cohesive thermoplatic material, said strands having forward ends comprising the thermoplastic material which first extrudes from said extruding means at the beginning of the extrusion operation, means for effectively withdrawing said extruding means therefrom, means operative while the extruding means withdraws to scrape said strands therefrom to cause the strands to lie, with the exception of their forward ends, against the inner sides of the female mold, means for causing the closing section of said mold to substantially close the rear end thereof as the extruding means withdraws therefrom, means for moving said mandrel and female mold relatively toward each other to cause the said forward ends of said strands as they lie inside said female mold as aforesaid to come into contact with the head end of said tubular body and be fused and molded thereto as he head for said tubular body.

10. Apparatus as in claim 9 wherein the shoulder of said mandrel and the shoulder forming surfaces of the said shoulder section of the female mold are non-parallel, being divergent outwardly in the direction of said male mold.

11. Apparatus as in claim 9 wherein said mandrel has a circumferential recess adjacent its shoulders and said tubular body is disposable on said mandrel so as to extend beyond said recess.

12. Apparatus as in claim 9 wherein the longitudinal axis of said mandrel and female mold is vertically disposed.

13. Apparatus as in claim 9 wherein said neck forming section includes means for forming threads.

14. Apparatus as in claim 9 wherein said neck forming section includes two halves movable toward and away from each other in a plane normal to the longitudinal axis of the extruding means, said halves when abutted forming an aperture as the aforesaid open rear end and being so dimensioned as to form the aforesaid scraping means, and means for moving said halves as aforesaid.

15. Apparatus as in claim 9 wherein said mandrel is movable successively by a turntable from said female mold to at least one further female mold, said further mold having an internal shape so as to continue the formation of the head on said tubular body toward final shape.

16. Apparatus as in claim 9 wherein the said neck forming section of said female mold includes two thread forming halves movable toward and away from each other in a plane normal to the longitudinal axis of the extruding means for forming threads having an oval periphery, means for moving said mandrel out of said female mold and into a second female mold before said head has fully set, said second female mold having a thread forming section for forming threads of circular periphery except for two diametrically opposed pips, and a third female mold having a section for forming threads with a completely circular periphery for pressing the pips of said head as they result from the aforesaid second female mold into the remaining portions of the said head as the headed tubular body is moved from said second mold into said third mold by the aforesaid mandrel moving means.

17. A plastic forming process comprising the steps of extruding hot cohesive thermoplastic material from a nozzle extending forwardly through a rear opening in a female mold, scraping the extruded material from the nozzle, relatively moving said nozzle and mold to remove the nozzle from the mold cavity, and relatively moving said mold and male die toward each other to form the scraped material in accordance with the shape of said female mold and male die.

18. A process as in claim 17 including the steps of guiding the mold and die in their relative movement toward each other to make them coaxial.

19. A process as in claim 17 and further including the steps of moving said mold and die apart while retaining the molded piece on said die, and then relatively moving said die and a second female mold toward each other to effect a further molding of said piece.

20. A process as in claim 17 including the step of disposing a tubular body on said male die so that the end surface of the body is approximately at the same level as a shoulder corner of said die to cause the scraped material to be welded to the end of the tubular body as it is being otherwise formed as aforesaid.

21. Plastic forming apparatus comprising a male mold section, a female mold section having a cavity open at its forward end for at least partially receiving said male section and having a rear opening, a nozzle extending axially of said male and female sections into said female section through said rear opening for extruding hot cohesive thermoplastic material from the forward end of said nozzle, means for scraping said thermoplastic material from said nozzle, and means for relatively moving said female section axially away from said nozzle and axially toward said male section to remove said nozzle from said cavity and at least close the cavity at its forward end by said male section for pressure molding the scraped thermoplastic material into a piece having a predetermined configuration determined by the mold formed by said male and female sections.

22. Apparatus as in claim 21 wherein said scraping means includes a nozzle housing axially movable relative to said nozzle, said nozzle having an opening through its side from which said thermoplastic material is cohesively extruded and scraped by said housing.

23. Apparatus as in claim 21 including means for assuring continuous axial alignment of said male and female mold sections from the time they begin to apply pressure on the scraped thermoplastic material through the remainder of the pressure molding thereof.

24. Apparatus as in claim 23 wherein the said alignment means includes a skirt projecting forwardly from said female mold section for first receiving and guiding said male section in its relative movement toward said female section.

25. Apparatus as in claim 24 wherein said male section includes a beveled shoulder against which the forward end of said skirt abuts and affects the aforesaid alignment.

26. Apparatus as in claim 25 wherein the inner periphery of said skirt forms side walls of said cavity, said skirt being biasable into said female mold section a distance sufficient to reduce the axial dimension of the mold to that desired while at the same time keeping the mold sections in true axial alignment.

27. Apparatus as in claim 21 wherein said male and female sections form the said piece into a blank unrelated in shape to the article to be produced, and further including means for causing the aforesaid relative moving means to separate said mold sections with said blank on said male section, means including a second female mold section cooperable with the aforesaid male section to effect a second mold of shape corresponding to the article to be produced from said blank, and means for relatively moving said male section and blank into mating relation with said second female section to form the aforesaid article.

28. Apparatus as in claim 27 including a sleeve spacedly surrounding said male sections and cooperable with said second female section to extend the second mold cavity further axially about said male section.

29. In a plastic-forming process including the steps of placing extruder means within an open female mold and disposing simultaneously a plurality of hot strands of cohesive thermoplastic material spacedly around the inside surface of the open female mold, and closing said mold with the aid of a male die to compress said strands into a molded article, the improvement comprising extruding said strands at a substantial acute angle to the longitudinal central axis of said female mold and into the space within said female mold by an extruder extending into said space through an opening in said female mold, and moving said mold toward said die to remove the strands from the extruder as the extruder exits from the mold by way of said opening.

30. In the process of making tubular thermoplastic containers by molding and fusing a head to a tubular body, the improvement including the steps of moving an extruder into the space in an open female head mold, extruding a plurality of discrete hot strands of cohesive thermoplastic material from said extruder, said strands having outer ends remote from said extruder, effectively drawing said extruder from said mold while laying said strands, with the main exception of their outer ends, around the inside surface of the mold, closing said mold with a male die to form the head of a thermoplastic container, and welding said head to a tubular body.

31. Plastic forming apparatus comprising an open female mold, said female mold having a rear aperture, extruder means movable into and out of said mold through said aperture for simultaneously placing hot strands of cohesive thermoplastic material at spaced points around the inner surface of said open female mold, means for positioning said extruder means within the open female mold, means for disjoining said strands from said extruder means during relative movement of said extruder and said mold for effecting withdrawal of the extruder therefrom, a male die, and means for relatively moving said die and said mold toward each other to close said mold and to mold from said strands an article shaped in accordance with the shapes of said die and said mold.

32. A process of making tubular thermoplastic containers including the steps of moving an extruder into the space of an open female mold, extruding cohesive thermoplastic material from the interior of said extruder and depositing said material laterally and in even distribution on the exterior surface thereof while said extruder is in said space within said female mold, retracting said extruder from said space by relative movement between said extruder and said female mold, stripping said material from said exterior surface of said extruder during said relative movement and closing said space in said female mold with the aid of a male die to maintain said material in said space.

33. A process of makng tubular thermoplastic containers by molding and fusing a head to a tubular body including the steps of moving an extruder into the space of an open female head mold, extruding cohesive thermoplastic material from the interior of said extruder and depositing said material to depend laterally in even distribution from the exterior surface thereof and into said space within said female mold, stripping said material from said exterior surface by retracting said extruder from said space and closing said space in said female mold with the aid of a male die to deposit said material on said male die for forming said head and fusing it to said tubular body.

34. Plastic forming apparatus comprising an open female mold having a rear end aperture, an extruder having a nozzle adapted for entry into said female mold through said rear end aperture and laterally disposed outlet means in said nozzle for extruding cohesive thermoplastic material therefrom and disposing it around said nozzle while in said female mold, said female mold including means for stripping the extruded thermoplastic material from said nozzle, a male die and means for moving said female mold relative to said nozzle and to said male die, to strip said material from said nozzle and to close said female mold with the aid of said male die.

35. A process of making tubular thermoplastic containers including the steps of moving an extruder into the space of an open female mold, extruding cohesive thermoplastic material from the interior of said extruder and depositing said material laterally and in even distribution on the exterior surface thereof while said extruder is in said space within said female mold, retracting said extruder by relative movement between said extruder and said female mold, stripping said material from said exterior surface of said extruder during said relative movement and transferring said material from said space in said female mold to a male die carrying a container body section to form an end portion thereon.

36. A process of making tubular thermoplastic containers by molding and fusing a head to a tubular body including the steps of moving an extruder into the space of an open female mold, extruding cohesive thermoplastic material from the interior of said extruder and depositing said material to depend laterally in even distribution from the exterior surface thereof and into said space within said female mold, stripping said material from said exterior surface by retracting said extruder from said space to form a head blank within said space and transferring said head blank from said space in said female mold to said male die for forming said head and fusing it to said tubular body.

37. A process of making tubular thermoplastic containers by molding and fusing a head to a tubular body including the steps of moving an extruder into the space of an open female mold, extruding cohesive thermoplastic material from the interior of said extruder and depositing said material to depend laterally in even distribution from the exterior surface thereof and into said space within said female mold, stripping said material from said exterior surface by retracting said extruder from said space, transferring said material from said space onto a male die carrying said tubular body while forming said material into a head blank, heating said head blank on said male die and fusing the heated material of said head blank to said tubular body while forming said head.

38. A process of making tubular thermoplastic containers by molding and fusing a head to a tubular body including the steps of moving an extruder into the space of a female blank forming mold, extruding an annular bead of cohesive thermoplastic material from the interior of said extruder and depositing said bead to depend laterally in even distribution from the exterior surface thereof and into said space within said blank forming mold, stripping said material from said exterior surface by retracting said extruder from said space, closing said blank forming mold with the aid of a male die carrying said tubular body while forming said material into a head blank separating said male die from said blank forming mold while retaining said head blank on said male die, heating said head blank on said male die introducing said head blank on said male die into a female head forming mold while closing said head forming mold with the aid of said male die and said tubular body and molding said head from said head blank while fusing it to said tubular body.

39. A process of making tubular thermoplastic containers by molding and fusing a head to a tubular body including the steps of moving an extruder into the space of an open female blank forming mold, extruding cohesive thermoplastic material from the interior of said extruder and depositing said material to depend laterally in even distribution from the exterior surface thereof and into said space within said blank forming mold, stripping said material from said exterior surface by retracting said extruder from said space and forming an annular blank within said space, ejecting said annular blank from said space and depositing it on a male die carrying said tubular body for forming said head from said annular blank and fusing it to said tubular body.

40. A process of making tubular thermoplastic containers by molding and fusing a head to a tubular body including the steps of moving an extruder into the space of an open female blank forming mold, extruding an annular bead of cohesive thermoplastic material from the interior of said extruder and depositing said annular bead to depend laterally in even distribution from the exterior surface thereof and into said space within said female mold, stripping said annular bead from said exterior surface by retracting said extruder from said space and forming an annular blank from said bead within said space, ejecting said annular blank from said space and depositing it on a male die carrying said tubular body heating said blank on said male die, introducing the heated blank with the aid of said male die into a female head forming mold to close the latter and molding said head from said head blank while fusing it to said tubular body.

41. Plastic forming apparatus comprising an open female mold having a rear end aperture, an extruder having a nozzle adapted for entry into said female mold through said rear end aperture and a circumferentially disposed outlet slot in said nozzle for extruding cohesive thermoplastic material therefrom and disposing it around said nozzle while in said female mold, said female mold including means for stripping the extruded thermoplastic material from said nozzle, a male die and means for moving said female mold relative to said nozzle and to said male die, to strip said material from said nozzle and to transfer it from said female mold to said male die.

42. Plastic forming apparatus as claimed in claim 41, wherein retaining means are provided on said male die to retain said material thereon after transfer from said mold.

43. Plastic forming apparatus as claimed in claim 42, said male die having a shoulder portion disposed to face said female mold, said retaining means forming an annular groove in said shoulder portion.

44. Plastic forming apparatus comprising an open female mold having a rear end aperture, an extruder having a nozzle adapted for entry into said female mold through said rear end aperture and a circumferentially disposed outlet slot in said nozzle for extruding cohesive thermoplastic material therefrom and disposing it around said nozzle while in said female mold, said female mold including means for stripping the extruded thermoplastic material from said nozzle, a male die and means for moving said female mold relative to said nozzle and to said male die, to strip said material from said nozzle, said female mold further including means for ejecting said material therefrom to deposit said material on said male die.

45. Plastic forming apparatus as claimed in claim 44, said means for stripping comprising a cutting edge surrounding said nozzle in contact therewith.

46. Plastic forming apparatus as claimed in claim 44, said means for ejecting comprising a plurality of openings in said female mold and a source of compressed medium connected to said openings.

References Cited by the Examiner
UNITED STATES PATENTS

| | | | |
|---|---|---|---|
| 2,648,098 | 8/1953 | McElliott | 264—281 XR |
| 2,883,706 | 4/1959 | Quinche. | |
| 3,225,127 | 12/1965 | Scott | 264—98 |
| 3,256,378 | 6/1966 | Hauf | 264—267 |

ROBERT F. WHITE, *Primary Examiner.*

R. B. MOFFITT, *Assistant Examiner.*